(12) United States Patent
Sredzki et al.

(10) Patent No.: US 11,884,304 B2
(45) Date of Patent: Jan. 30, 2024

(54) SYSTEM, METHOD, AND COMPUTER PROGRAM PRODUCT FOR TRAJECTORY SCORING DURING AN AUTONOMOUS DRIVING OPERATION IMPLEMENTED WITH CONSTRAINT INDEPENDENT MARGINS TO ACTORS IN THE ROADWAY

(71) Applicant: Ford Global Technologies, LLC, Dearborn, MI (US)

(72) Inventors: Arek Viko Sredzki, San Mateo, CA (US); Mark Ollis, Pittsburgh, PA (US); Christopher Cunningham, Pittsburgh, PA (US); Neal Andrew Seegmiller, Pittsburgh, PA (US); Patrick Stirling Barone, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 17/468,961

(22) Filed: Sep. 8, 2021

(65) Prior Publication Data
US 2023/0074873 A1     Mar. 9, 2023

(51) Int. Cl.
*B60W 60/00*     (2020.01)
*B60W 50/00*     (2006.01)

(52) U.S. Cl.
CPC .. *B60W 60/00274* (2020.02); *B60W 50/0098* (2013.01); *B60W 2050/006* (2013.01); *B60W 2552/45* (2020.02); *B60W 2554/20* (2020.02); *B60W 2554/402* (2020.02); *B60W 2554/4026* (2020.02); *B60W 2554/4029* (2020.02);
(Continued)

(58) Field of Classification Search
None
See application file for complete search history.

(56) References Cited

U.S. PATENT DOCUMENTS

| | | | |
|---|---|---|---|
| 8,457,892 B2 | 6/2013 | Aso et al. | |
| 8,543,261 B2 | 9/2013 | Anderson et al. | |
| (Continued) | | | |

FOREIGN PATENT DOCUMENTS

| | | | |
|---|---|---|---|
| DE | 102014211507 A1 | 12/2015 | |
| EP | 1990788 A1 | 11/2008 | |
| (Continued) | | | |

*Primary Examiner* — David P. Merlino
(74) *Attorney, Agent, or Firm* — Frank MacKenzie; Brooks Kushman, P.C.

(57) ABSTRACT

Provided are autonomous vehicles (AV), computer program products, and methods for maneuvering an AV in a roadway, including receiving forecast information associated with predicted trajectories of one or more actors in a roadway, determining a relevant trajectory of an actor based on correlating a forecast for predicted trajectories of the actor with the trajectory of the AV, regenerate a distance table for the relevant trajectory previously generated for processing constraints, generate a plurality of margins for the AV to evaluate, the margins based on a plurality of margin types for providing information about risks and effects on passenger comfort associated with a future proximity of the AV to the actor, classifying an interaction between the AV and the actor based on a plurality of margins, and generating continuous scores for each candidate trajectory that is also within the margin of the actor generated for the relevant trajectory.

18 Claims, 8 Drawing Sheets

(52) U.S. Cl.
CPC ............... *B60W 2554/4041* (2020.02); *B60W 2554/801* (2020.02); *B60W 2554/802* (2020.02); *B60W 2554/803* (2020.02); *B60W 2554/804* (2020.02)

(56) References Cited

U.S. PATENT DOCUMENTS

| | | | |
|---|---|---|---|
| 8,655,579 | B2 | 2/2014 | Sakugawa et al. |
| 10,216,189 | B1* | 2/2019 | Haynes ............ B60W 60/00276 |
| 10,553,117 | B1* | 2/2020 | Johnson ............. B60W 30/0956 |
| 10,614,717 | B2 | 4/2020 | Caldwell et al. |
| 11,004,000 | B1* | 5/2021 | Gutmann ........... B60W 30/0956 |
| 11,077,816 | B1* | 8/2021 | Bates .................... B60R 21/013 |
| 11,225,247 | B2* | 1/2022 | Beller .............. B60W 30/18154 |
| 2019/0143969 | A1* | 5/2019 | Al-Stouhi ............. B60W 10/04 |
| | | | 701/41 |
| 2020/0086855 | A1 | 3/2020 | Packer et al. |
| 2020/0094823 | A1* | 3/2020 | Velkey ................. G06V 40/103 |
| 2020/0133280 | A1 | 4/2020 | Seccamonte et al. |
| 2020/0139959 | A1 | 5/2020 | Akella et al. |
| 2021/0009128 | A1* | 1/2021 | Jokela ................. B60W 30/146 |
| 2021/0046927 | A1* | 2/2021 | Miller ............... B60W 30/0953 |
| 2021/0061309 | A1* | 3/2021 | Kawanai ............ B60W 60/0011 |
| 2021/0197809 | A1* | 7/2021 | Trukhanovich ........... G06T 7/70 |

FOREIGN PATENT DOCUMENTS

| | | | |
|---|---|---|---|
| EP | 2549456 | A1 | 1/2013 |
| EP | 3647735 | A1 | 5/2020 |

* cited by examiner

SYSTEM, METHOD, AND COMPUTER PROGRAM PRODUCT FOR TRAJECTORY SCORING DURING AN AUTONOMOUS DRIVING OPERATION IMPLEMENTED WITH CONSTRAINT INDEPENDENT MARGINS TO ACTORS IN THE ROADWAY

BACKGROUND

Field

This disclosure relates generally to topological planning and, in some non-limiting embodiments or aspects, to systems, methods, and computer program products for generating scores in a continuous manner and evaluating the scores for the margins to other relevant actors in a computationally efficient manner, by determining scores for candidate trajectories based on dynamic margins between an autonomous vehicle (AV) and the predicted trajectories of actors in the same roadway or actors entering the same roadway.

Description of Related Art

The AV is required to find an optimal road/lane-level path from the AV's current location to a specified destination (e.g., a goal position, etc.) in a map including a road network. To travel autonomously may require a route; however, navigating a route may involve the creation and evaluation of at least one trajectory or path through the road network and may require evaluating any number of potential lane changes (for example, the AV may merge into a leftmost lane to make a left turn, perform lane changes to overtake a slower object, etc.), as well as, in-lane maneuvers (for example, tracking behind an object, stopping before a stationary object, steering around a stationary object, etc.).

Creating a trajectory to handle lane changes to account for constraints (e.g., objects in the roadway, other cars, pedestrians, bus stops, train crossings, etc.) in an environment of the AV may involve processing and storing a vast amount of information defining the roadway in the electronic memory of a vehicle computing device and calculating a cost function for each of a plurality of constraints in the environment of the surrounding roadway, up to a destination of the vehicle. Such calculations may also take into account a state of the vehicle that includes a location and an orientation of the vehicle and the dynamic capabilities of the AV. Only then may an obstacle-free trajectory be determined for the AV from its current location to the goal position by minimizing a calculated cost and comparing one or more costs associated with each obstacle-free trajectory.

For performing lane changes, the AV may perform calculations to determine a number of possible candidate trajectories, which may be infinitely expensive in terms of computing cost (e.g., computationally infeasible, etc.) because of the number of variations of transition start/end locations, transition start/end times, steering/speed profiles, and/or the like. In some navigating conditions, such as, dense traffic, to successfully complete a lane change may require the AV to make a complex maneuver, for example, to speed up and steer abruptly into a narrow gap between vehicles in the destination lane that is currently several vehicles ahead. In existing autonomous driving systems that only consider a finite number of lane change variations, it is not possible to strategically select the variations explored in order to plan a successful lane change maneuver in these conditions.

Similarly, for in-lane maneuvers, systems may only sample a finite number of candidate trajectories in the road network, either by discretization or random sampling. Because the number of sampled trajectories is limited, this approach may fail to find a feasible trajectory when one exists, or it may find a suboptimal trajectory, because feasible or optimal trajectories are not sampled.

SUMMARY

Accordingly, disclosed are improved computer-implemented systems, methods, and computer program products for trajectory scoring during an autonomous driving operation implemented with constraint independent margins to actors in the roadway.

According to non-limiting embodiments or aspects, provided is a computer-implemented method of maneuvering an autonomous vehicle (AV) traversing a roadway, comprising: receiving, by one or more processors of a vehicle computing system, forecast information associated with one or more predicted trajectories of one or more actors in the roadway; regenerating, by the one or more processors, a distance table for a relevant trajectory of an action, using an original distance table which was previously generated for processing constraints, the relevant trajectory being based on a forecast for one or more predicted trajectories of the actor with the trajectory of the AV; generating, by the one or more processors, a plurality of margins for the AV to evaluate, the plurality of margins being based on a plurality of margin types for providing information about risks and effects on passenger comfort associated with a future proximity of the AV to the actor; generating, by the one or more processors, continuous scores for each candidate trajectory that is also within the margin of the actor generated for the relevant trajectory; and issuing, by the one or more processors, a command to control the AV based on the continuous scores, to maneuver with respect to a plurality of constraints in the roadway.

In some non-limiting embodiments or aspects, the computer-implemented method further includes that the plurality of margins include at least one of a longitudinal margin or a lateral margin and generating the plurality of margins further comprises: generating a temporal longitudinal margin associated with a relevant time interval based on time remaining until the AV reaches the actor, generating the temporal longitudinal margin, including for the relevant time interval: determining a position of the AV on a reference path and the nearest time interval where a location of a longitudinal interval of the actor overlaps with that of the position; and generating a spatial longitudinal margin providing information for determining proximity of the actor when moving at low speeds where the temporal longitudinal margins may be large despite the AV having a small spatial margin to the actor, generating the spatial longitudinal margin includes for each relevant time interval: determining lateral distance table entries of the actor and determining a location interval of the reference path over which the actor is deemed within a threshold of the candidate trajectory and considered in the reference path of the AV; and generating a lateral margin distance as the minimum lateral offset value over a longitudinal location interval of the AV for the time interval being evaluated.

In some non-limiting embodiments or aspects, the computer-implemented method further includes that classifying an interaction between the AV and the actor, wherein the classifying the interaction comprises: in response to predicting a collision, performing an interaction classification to identify a time step associated with an instance of the collision, wherein the interaction classification identifies the time step in a time sequence of a collision time interval that a first polygon intersection is found, wherein the first polygon intersection identifies the collision time interval based on a first longitudinal margin of a plurality of longitudinal margins that indicates a collision; and otherwise, for each time interval, performing an interaction classification to identify a spatial longitudinal margin accounted to be the minimum spatial longitudinal margin in the location interval of the reference path when the actor is predicted to be at a minimum distance from the candidate trajectory of the AV's path, or alternatively, identifying the time interval over the longitudinal location interval of the actor when it is predicted to have a minimum lateral offset value from the candidate trajectory of the AV.

In some non-limiting embodiments or aspects, the computer-implemented method further includes that the computer-implemented method of claim 1, wherein a previous AV-side of the actor comprises at least one of: ahead-of-AV; behind-AV; unknown; or undetermined.

In some non-limiting embodiments or aspects, the computer-implemented method further comprises, iterating over time intervals to propagate information to each interval along the trajectory; and generating an AV-side of the actor at each time interval based on a distance margin, and one or more parameters for scoring longitudinal margins that can change based on the AV-side of the actor.

In some non-limiting embodiments or aspects, the computer-implemented method further comprises identifying whether a spatial gap exists including at least one time interval since a previous time interval which, when traversed by the actor was not included in a reference path of the AV, and predicting, based on the time interval, whether the AV is predicted to move through the actor, or alternatively, beside or around the actor, based on when a distance interval switches from ahead of to behind the AV, or alternatively, behind the AV to ahead of the AV, the method comprising: setting a previous AV-side of the actor to be unknown if a spatial gap has been identified and there has not been a collision; setting the AV-side of the actor to be unaltered at a time interval based on a longitudinal distance margin and detecting a collision when a longitudinal distance margin is equal to zero; detecting a collision has occurred when a current AV-side of the actor has been altered and a gap in the interval is not found; and setting a current AV-side of the actor as the previous AV-side of the actor when a collision has occurred.

In some non-limiting embodiments or aspects, the computer-implemented method further includes that further comprises a backward propagation of a plurality of longitudinal margins from a first point of intersection between the actor and the AV, wherein backward propagation is determined by iterating backward over each time interval and setting an AV-side of the actor if it is unknown for a current time interval, using a previous time interval.

In some non-limiting embodiments or aspects, the computer-implemented method further includes that providing interaction classification comprises at least one of: providing scoring margins; configuring to remove uncertainty; incorporating right of way; or incorporating collision severity.

In some non-limiting embodiments or aspects, the computer-implemented method further includes that a probability of a collision is based on one of: 1) a probability of a prediction adjusted to consider a right of way and reactivity, or 2) a predicted probability of compliance and an ability to adjust course; and wherein a severity of an anticipated collision is based on one of: 1) a relative speed of the AV and the actor, 2) an actor classification comprising one of: a vulnerable road user; a vehicle; an animal; a static actor; or a background actor, or 3) a point of impact on the AV, on the actor, or both.

In some non-limiting embodiments or aspects, the computer-implemented method further includes that generating continuous scores for each candidate trajectory is based on one or more of: a penalty configured by transforming a margin value at each time interval into a penalty; a discount factor to account for increasing uncertainty about interactions that will be performed further in the future, wherein each subsequent time interval is offset from a start of a planning cycle; an actor-type factor, discounting parameters per actor type, including at least one of a vehicle, a crosswalk-following pedestrian, other pedestrian, cyclist, or other object, to apply based on interaction classifications; or a social acceptability factor that classifies a decision taken by a candidate trajectory with respect to the margins to a plurality of actors simultaneously.

According to non-limiting embodiments or aspects, provided is an autonomous vehicle or autonomous vehicle compute system, comprising one or more processors; and a memory that stores one or more instructions that, when executed by the one or more processors, cause the one or more processors to: receive forecast information associated with one or more predicted trajectories of one or more actors in the roadway; regenerate a distance table for the relevant trajectory of an action, using an original distance table which was previously generated for processing constraints, the relevant trajectory being based on a forecast for one or more predicted trajectories of the actor with the trajectory of the AV; generate a plurality of margins for the AV to evaluate, the plurality of margins being based on a plurality of margin types for providing information about risks and effects on passenger comfort associated with a future proximity of the AV to the actor; generate continuous scores for each candidate trajectory that is also within the margin of the actor generated for the relevant trajectory; and issue a command to control the AV based on the continuous scores, to maneuver with respect to a plurality of constraints in the roadway.

According to non-limiting embodiments or aspects, a computer program product for cloud and autonomous vehicle compute testing, comprising at least one non-transitory computer-readable medium including one or more instructions that, when executed by at least one processor, cause the one or more processors to: generate a temporal longitudinal margin associated with a relevant time interval based on time remaining until the AV reaches the actor, generating the temporal longitudinal margin includes for the relevant time interval, determining a position of the AV on a reference path and the nearest time interval where a location of a longitudinal interval of the actor overlaps with that of the position; generate a spatial longitudinal margin providing information for determining proximity of the actor when moving at low speeds where the temporal longitudinal margins may be large despite the AV having a small spatial margin to the actor, generating the spatial longitudinal margin includes for each relevant time interval: determine lateral distance table entries of the actor and determining a location interval of the reference path over which the actor is deemed within a threshold of the candidate trajectory and considered in the reference path of the AV; and generate a lateral margin distance as the minimum lateral offset value over a longitudinal location interval of the AV for the time interval being evaluated.

Further non-limiting embodiments or aspects are set forth in the following numbered clauses:

Clause 1: A computer-implemented method of maneuvering an autonomous vehicle (AV) traversing a roadway, comprising: receiving, by one or more processors of a vehicle computing system, forecast information associated with one or more predicted trajectories of one or more actors in the roadway; regenerating, by the one or more processors, a distance table for a relevant trajectory of an action, using an original distance table which was previously generated for processing constraints, the relevant trajectory being based on a forecast for one or more predicted trajectories of the actor with the trajectory of the AV; generating, by the one or more processors, a plurality of margins for the AV to evaluate, the plurality of margins being based on a plurality of margin types for providing information about risks and effects on passenger comfort associated with a future proximity of the AV to the actor; generating, by the one or more processors, continuous scores for each candidate trajectory that is also within the margin of the actor generated for the relevant trajectory; and issuing, by the one or more processors, a command to control the AV based on the continuous scores, to maneuver with respect to a plurality of constraints in the roadway.

Clause 2: The computer-implemented method of clause 1, wherein the plurality of margins include at least one of a longitudinal margin or a lateral margin and generating the plurality of margins further comprises: generating a temporal longitudinal margin associated with a relevant time interval based on time remaining until the AV reaches the actor, generating the temporal longitudinal margin, including for the relevant time interval: determining a position of the AV on a reference path and the nearest time interval where a location of a longitudinal interval of the actor overlaps with that of the position; and generating a spatial longitudinal margin providing information for determining proximity of the actor when moving at low speeds where the temporal longitudinal margins may be large despite the AV having a small spatial margin to the actor, generating the spatial longitudinal margin includes for each relevant time interval: determining lateral distance table entries of the actor and determining a location interval of the reference path over which the actor is deemed within a threshold of the candidate trajectory and considered in the reference path of the AV; and generating a lateral margin distance as the minimum lateral offset value over a longitudinal location interval of the AV for the time interval being evaluated.

Clause 3: The computer-implemented method of clauses 1-2, further comprising classifying an interaction between the AV and the actor, wherein the classifying the interaction comprises: in response to predicting a collision, performing an interaction classification to identify a time step associated with an instance of the collision, wherein the interaction classification identifies the time step in a time sequence of a collision time interval that a first polygon intersection is found, wherein the first polygon intersection identifies the collision time interval based on a first longitudinal margin of a plurality of longitudinal margins that indicates a collision; and otherwise, for each time interval, performing an interaction classification to identify a spatial longitudinal margin accounted to be the minimum spatial longitudinal margin in the location interval of the reference path when the actor is predicted to be at a minimum distance from the candidate trajectory of the AV's path, or alternatively, identifying the time interval over the longitudinal location interval of the actor when it is predicted to have a minimum lateral offset value from the candidate trajectory of the AV.

Clause 4: The computer-implemented method of clauses 1-3, wherein a previous AV-side of the actor comprises at least one of: ahead-of-AV; behind-AV; unknown; or undetermined.

Clause 5: The computer-implemented method of clauses 1-4, further comprising: iterating over time intervals to propagate information to each interval along the trajectory; and generating an AV-side of the actor at each time interval based on a distance margin, and one or more parameters for scoring longitudinal margins that can change based on the AV-side of the actor.

Clause 6: The computer-implemented method of clauses 1-5, further comprising: identifying whether a spatial gap exists including at least one time interval since a previous time interval which, when traversed by the actor was not included in a reference path of the AV, and predicting, based on the time interval, whether the AV is predicted to move through the actor, or alternatively, beside or around the actor, based on when a distance interval switches from ahead of to behind the AV, or alternatively, behind the AV to ahead of the AV, the method comprising: setting a previous AV-side of the actor to be unknown if a spatial gap has been identified and there has not been a collision; setting the AV-side of the actor to be unaltered at a time interval based on a longitudinal distance margin and detecting a collision when a longitudinal distance margin is equal to zero; detecting a collision has occurred when a current AV-side of the actor has been altered and a gap in the interval is not found; and setting a current AV-side of the actor as the previous AV-side of the actor when a collision has occurred.

Clause 7: The computer-implemented method of clauses 1-6, further comprising a backward propagation of a plurality of longitudinal margins from a first point of intersection between the actor and the AV, wherein backward propagation is determined by iterating backward over each time interval and setting an AV-side of the actor if it is unknown for a current time interval, using a previous time interval.

Clause 8: The computer-implemented method of clauses 1-7, wherein providing interaction classification comprises at least one of: providing scoring margins; configuring to remove uncertainty; incorporating right of way; or incorporating collision severity.

Clause 9: The computer-implemented method of clauses 1-8, wherein a probability of a collision is based on one of: 1) a probability of a prediction adjusted to consider a right of way and reactivity, or 2) a predicted probability of compliance and an ability to adjust course; and wherein a severity of an anticipated collision is based on one of: 1) a relative speed of the AV and the actor, 2) an actor classification comprising one of: a vulnerable road user; a vehicle; an animal; a static actor; or a background actor, or 3) a point of impact on the AV, on the actor, or both.

Clause 10: The computer-implemented method of clauses 1-9, wherein generating continuous scores for each candidate trajectory is based on one or more of: a penalty configured by transforming a margin value at each time interval into a penalty; a discount factor to account for increasing uncertainty about interactions that will be performed further in the future, wherein each subsequent time interval is offset from a start of a planning cycle; an actor-type factor, discounting parameters per actor type, including at least one of a vehicle, a crosswalk-following pedestrian, other pedestrian, cyclist, or other object, to apply based on interaction classifications; or a social acceptability factor that classifies a decision taken by a candidate trajectory with respect to the margins to a plurality of actors simultaneously.

Clause 11: A system for maneuvering an autonomous vehicle (AV) traversing a roadway, comprising: one or more processors; and a memory that stores one or more instructions that, when executed by the one or more processors, cause the one or more processors to: receive forecast information associated with one or more predicted trajectories of one or more actors in the roadway; regenerate a distance table for the relevant trajectory of an action, using an original distance table which was previously generated for processing constraints, the relevant trajectory being based on a forecast for one or more predicted trajectories of the actor with the trajectory of the AV; generate a plurality of margins for the AV to evaluate, the plurality of margins being based on a plurality of margin types for providing information about risks and effects on passenger comfort associated with a future proximity of the AV to the actor; generate continuous scores for each candidate trajectory that is also within the margin of the actor generated for the relevant trajectory; and issue a command to control the AV based on the continuous scores, to maneuver with respect to a plurality of constraints in the roadway.

Clause 12: The system of clause 11, wherein the plurality of margins include at least one of a longitudinal margin or a lateral margin, and the one or more processors are further configured to: generate a temporal longitudinal margin associated with a relevant time interval based on time remaining until the AV reaches the actor, generating the temporal longitudinal margin includes for the relevant time interval, determining a position of the AV on a reference path and the nearest time interval where a location of a longitudinal interval of the actor overlaps with that of the position; and generate a spatial longitudinal margin providing information for determining proximity of the actor when moving at low speeds, where the temporal longitudinal margins may be large despite the AV having a small spatial margin to the actor, and generating the spatial longitudinal margin, includes for each relevant time interval, further comprising: generating lateral distance table entries associated with the actor; generating a location interval of the reference path over which the actor is deemed within a threshold of the candidate trajectory and considered in the reference path of the AV; and generating a lateral margin distance as the minimum lateral offset value over a longitudinal location interval of the AV for the time interval being evaluated.

Clause 13: The system of clauses 11-12, wherein the one or more processors are further configured to classify an interaction between the AV and the actor to: perform, in response to predicting a collision, an interaction classification to identify a time step associated with an instance of the collision, wherein the interaction classification identifies the time step in a time sequence of a collision time interval that a first polygon intersection is found, wherein the first polygon intersection identifies the collision time interval based on a first longitudinal margin of a plurality of longitudinal margins that indicates a collision; and otherwise, for each time interval, perform an interaction classification to identify a spatial longitudinal margin accounted to be the minimum spatial longitudinal margin in the location interval of the reference path when the actor is predicted to be the least distance from the candidate trajectory of the AV's path, or alternatively, identify the time interval over the longitudinal location interval of the actor when it is predicted to have a minimum lateral offset value from the candidate trajectory of the AV.

Clause 14: The system of clauses 11-13, wherein the one or more processors are further configured to: identify whether a spatial gap exists including at least one time interval since a previous time interval which, when traversed by the actor, was not included in a reference path of the AV, and predicting, based on the time interval, whether the AV is predicted to move through the actor, or alternatively, beside or around the actor, based on when a distance interval switches from ahead of the AV to behind the AV or, alternatively, behind the AV to ahead of the AV, the system further comprising at least one of: setting a previous AV-side of the actor to be unknown if a spatial gap has been identified and there has not been a collision; setting the AV-side of the actor to be unaltered at a time interval based on a longitudinal distance margin and detecting a collision when a longitudinal distance margin is equal to zero; detecting a collision has occurred when a current AV-side of the actor has been altered and a gap in the interval is not found; or setting a current AV-side of the actor as the previous AV-side of the actor when a collision has occurred.

Clause 15: The system of clauses 11-14, wherein the one or more processors are further configured to backward propagate a plurality of longitudinal margins from a first point of intersection between the actor and the AV, wherein backward propagation is determined by iterating backward over each time interval and setting an AV-side of the actor if it is unknown for a current time interval, using a previous time interval.

Clause 16: The system of clauses 11-15, wherein providing interaction classification comprises providing scoring margins, configured to remove uncertainty, incorporate right of way, or incorporate collision severity.

Clause 17: The system of clauses 11-16, wherein a probability of a collision is based on one of: 1) a probability of a prediction adjusted to consider a right of way and reactivity, or 2) a predicted probability of compliance and an ability to adjust course; and wherein a severity of an anticipated collision is based on one of: 1) a relative speed of the AV and the actor, 2) an actor classification comprising one of: a vulnerable road user; a vehicle; an animal; a static actor; or a background actor, or 3) a point of impact on the AV, on the actor, or both.

Clause 18: The system of clauses 11-17, wherein the scores for each candidate trajectory, are based on one or more of: a penalty configured by transforming a margin value at each time interval into a penalty; a discount factor to account for increasing uncertainty about interactions that will be performed further in the future, wherein each subsequent time interval is offset from a start of a planning cycle; an actor-type factor, discounting parameters per actor type, including at least one of a vehicle, a crosswalk-following pedestrian, other pedestrian, cyclist, or other object, to apply based on interaction classifications; or a social acceptability factor that classifies a decision taken by a candidate trajectory with respect to the margins to a plurality of actors simultaneously.

Clause 19: A computer program product for maneuvering an autonomous vehicle (AV) traversing a route on a roadway, comprising at least one non-transitory computer-readable medium including one or more instructions that, when executed by one or more processors, cause the one or more processors to: receive forecast information associated with one or more predicted trajectories of one or more actors in a roadway; regenerate a distance table for the relevant trajectory of an action, using an original distance table which was previously generated for processing constraints, the relevant trajectory being based on a forecast for one or more predicted trajectories of the actor with the trajectory of the AV; generate a plurality of margins for the AV to evaluate, the margins based on a plurality of margin types for providing information about risks and effects on passenger comfort associated with a future proximity of the AV to the actor; generate continuous scores for each candidate trajectory that is also within the margin of the actor generated for the relevant trajectory; and issue a command to control the AV based on the continuous scores, to maneuver with respect to a plurality of constraints in the roadway.

Clause 20: The computer program product of clause 19, wherein the plurality of margins include at least one of a longitudinal margin or a lateral margin, and further including one or more instructions that, when executed by the one or more processors, cause the one or more processors to: generate a temporal longitudinal margin associated with a relevant time interval based on time remaining until the AV reaches the actor, generate the temporal longitudinal margin includes for the relevant time interval, and determine a position of the AV on a reference path and the nearest time interval where a location of a longitudinal interval of the actor overlaps with that of the position, further comprising; generating a spatial longitudinal margin providing information for determining proximity of the actor when moving at low speeds where the temporal longitudinal margins may be large despite the AV having a small spatial margin to the actor, generating the spatial longitudinal margin includes for each relevant time interval; generating lateral distance table entries of the actor and determine a location interval of the reference path over which the actor is deemed within a threshold of the candidate trajectory and considered in the reference path of the AV; and generating a lateral margin distance as the minimum lateral offset value over a longitudinal location interval of the AV for the time interval being evaluated.

These and other features and characteristics of the present disclosure, as well as, the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1A:
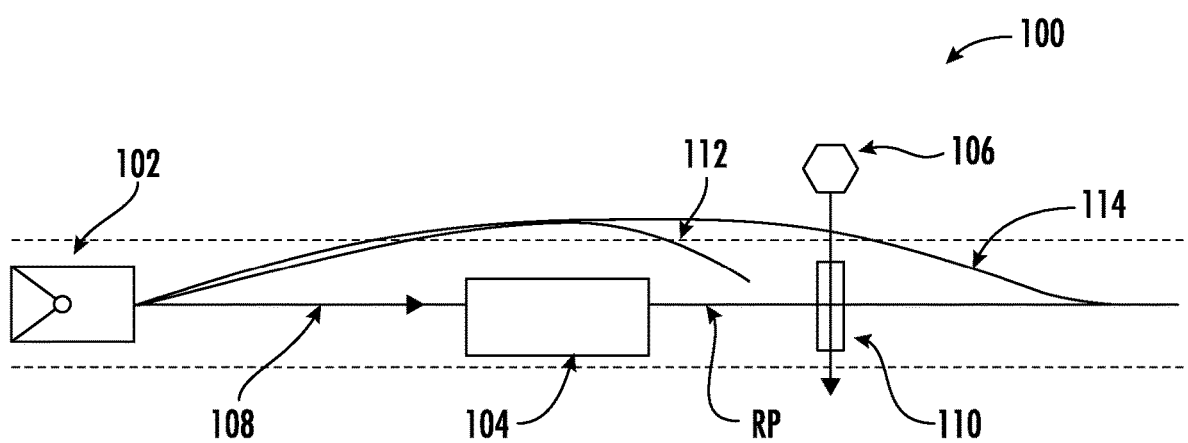
FIGS. 1A-1B are diagrams of non-limiting embodiments or aspects of a margin scoring environment in which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments or aspects disclosed herein are not to be considered as limiting unless otherwise indicated. In addition, terms of relative position, such as, "vertical" and "horizontal", "ahead" and "behind", or "front" and "rear", when used, are intended to be relative to each other and need not be absolute, and only refer to one possible position of the device associated with those terms depending on the device's orientation.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Additionally, when terms, such as, "first" and "second" are used to modify a noun, such use is simply intended to distinguish one item from another, and is not intended to require a sequential order unless specifically stated.

In some non-limiting embodiments or aspects, one or more aspects may be described herein, in connection with thresholds (e.g., a tolerance, a tolerance threshold, etc.). As used herein, satisfying a threshold may refer to a value (e.g., a score, an objective score, etc.) being greater than the threshold, more than the threshold, higher than the threshold, greater than or equal to the threshold, less than the threshold, fewer than the threshold, lower than the threshold, less than or equal to the threshold, equal to the threshold, etc.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the term "computing device" may refer to one or more electronic devices configured to process data. A computing device may, in some examples, include the necessary components to receive, process, and output data, such as, a processor, a display, a memory, an input device, a network interface, and/or the like. A computing device may be included in a device onboard an autonomous vehicle (AV). As an example, a computing device may include an onboard specialized computer (e.g., a sensor, a controller, a data store, a communication interface, a display interface, etc.), a mobile device (e.g., a smartphone, standard cellular phone, or integrated cellular device), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "client" and "client device" may refer to one or more computing devices that access a service made available by a server. In some non-limiting embodiments or aspects, a "client device" may refer to one or more devices that facilitate a maneuver by an AV, such as, one or more remote devices communicating with an AV. In some non-limiting embodiments or aspects, a client device may include a computing device configured to communicate with one or more networks and/or facilitate vehicle movement, such as, but not limited to, one or more vehicle computers, one or more mobile devices, and/or other like devices.

As used herein, the term "server" may refer to or include one or more computing devices that are operated by or facilitate communication and processing for multiple parties in a network environment, such as, the Internet, although it will be appreciated that communication may be facilitated over one or more public or private network environments and that various other arrangements are possible. Further, multiple computing devices (e.g., servers, data stores, controllers, communication interfaces, mobile devices, and/or the like) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices, such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, an "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

As used herein, the terms "memory," "memory device," "data store," "data storage facility," and the like each refer to a non-transitory device on which computer-readable data, programming instructions, or both are stored. Except where specifically stated otherwise, the terms "memory," "memory device," "data store," "data storage facility," and the like are intended to include single device embodiments, embodiments in which multiple memory devices together or collectively store a set of data or instructions, as well as, individual sectors within such devices.

As used herein, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

As used herein, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones, and the like. An "autonomous vehicle" (AV) is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. The AV can be a ground-based AV (e.g., car, truck, bus, etc.), an air-based AV (e.g., airplane, drone, helicopter, or other aircraft), or other types of vehicles (e.g., watercraft).

As used herein, the terms "trajectory" and "trajectories" may refer to a path (e.g., a path through a geospatial area, etc.) with positions of the AV along the path with respect to time, where a "path" generally implies a lack of temporal information, one or more paths for navigating an AV in a roadway for controlling travel of the AV on the roadway. A trajectory may be associated with a map of a geographic area including the roadway. In such an example, the path may traverse a roadway, an intersection, an other connection or link of the road with another road, a lane of the roadway, objects in proximity to and/or within the road, and/or the like. For example, a trajectory may define a path of travel on a roadway for an AV that follows each of the rules (e.g., the path of travel does not cross a yellow line, etc.) associated with the roadway. In such an example, an AV that travels over or follows the trajectory (e.g., that travels on the roadway without deviating from the trajectory, etc.) may obey each of the rules or account for constraints (e.g., objects in the roadway, does not cross the yellow line, etc.) associated with the roadway.

As used herein, "map data" includes data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. According to some embodiments, a map of a geographic location includes one or more routes (e.g., a nominal route, a driving route, etc.) that include one or more roadways. According to some non-limiting embodiments or aspects, map data associated with a map of the geographic location associates the one or more roadways with an indication of whether an AV can travel on that roadway.

As used herein, a "road" refers to a paved or an otherwise improved path between two places that allows for travel by a vehicle (e.g., AV). Additionally or alternatively, a road includes a roadway and a sidewalk in proximity to (e.g., adjacent, near, next to, abutting, touching, etc.) the roadway. In some non-limiting embodiments or aspects, a roadway includes a portion of a road on which a vehicle is intended to travel and is not restricted by a physical barrier or by separation so that the vehicle is able to travel laterally. Additionally or alternatively, a roadway (e.g., a road network, one or more roadway segments, etc.) includes one or more lanes in which a vehicle may operate, such as, a travel lane (e.g., a lane upon which a vehicle travels, a traffic lane, etc.), a parking lane (e.g., a lane in which a vehicle parks), a turning lane (e.g., a lane in which a vehicle turns from), and/or the like. Additionally or alternatively, a roadway includes one or more lanes in which a pedestrian, bicycle, or other vehicle may travel, such as, a crosswalk, a bicycle lane (e.g., a lane in which a bicycle travels), a mass transit lane (e.g., a lane in which a bus may travel), and/or the like. According to some non-limiting embodiments, a roadway is connected to another roadway to form a road network, for example, a lane of a roadway is connected to another lane of the roadway and/or a lane of the roadway is connected to a lane of another roadway. In some non-limiting embodiments, an attribute of a roadway includes a road edge of a road (e.g., a location of a road edge of a road, a distance of location from a road edge of a road, an indication whether a location is within a road edge of a road, etc.), an intersection, a connection, or a link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like.

As used herein, navigating (e.g., traversing, driving, etc.) a route may involve the creation of at least one trajectory or path through the road network and may include any number of maneuvers or an evaluation of any number of maneuvers (e.g., a simple maneuver, a complex maneuver, etc.), such as, a maneuver involving certain driving conditions, such as, dense traffic, where successfully completing a lane change may require a complex maneuver, like speeding up, slowing down, stopping, or abruptly turning, for example, to steer into a narrow gap between vehicles, pedestrians, or other objects (as detailed herein) in a destination lane. Additionally, in-lane maneuvers may also involve an evaluation of any number of maneuvers, such as, a maneuver to traverse a lane split, an intersection (e.g., a three-leg, a four-leg, a multileg, a roundabout, a T-junction, a Y-intersection, a traffic circle, a fork, turning lanes, a split intersection, a town center intersection, etc.), a travel lane (e.g., a lane upon which a vehicle travels, a traffic lane, etc.), a parking lane (e.g., a lane in which a vehicle parks), a turning lane (e.g., a lane from which a vehicle turns, etc.), merging lanes (e.g., two lanes merging to one lane, one lane ends and merges into a new lane to continue, etc.), and/or the like. Maneuvers may also be based on current traffic conditions that may involve an evaluation of any number of maneuvers, such as, a maneuver based on a current traffic speed of objects in the roadway, current accidents or other incidents in the roadway, weather conditions in the geographic area (e.g., rain, fog, hail, sleet, ice, snow, etc.), or road construction projects. In addition, maneuvers may also involve an evaluation of any number of objects in and around the roadway, such as, a maneuver to avoid an object in proximity to a road, such as, structures (e.g., a building, a rest stop, a toll booth, a bridge, etc.), traffic control objects (e.g., lane markings, traffic signs, traffic lights, lampposts, curbs of the road, a gully, a pipeline, an aqueduct, a speedbump, a speed depression, etc.), a lane of a roadway (e.g., a parking lane, a turning lane, a bicycle lane, etc.), a crosswalk, a bicycle lane (e.g., a lane in which a bicycle travels), a mass transit lane (e.g., a travel lane in which a bus, a train, a light rail, and/or the like may travel), objects in proximity to and/or within a road (e.g., a parked vehicle, a double parked vehicle, vegetation, a lamppost, signage, a traffic sign, a bicycle, a railway track, a hazardous object, etc.), a sidewalk of a road, and/or the like.

As used herein, "sensor data" includes data from one or more sensors. For example, sensor data may include light detection and ranging (LiDAR) point cloud maps (e.g., map point data, etc.) associated with a geographic location (e.g., a location in three-dimensional space relative to the LiDAR system of a mapping vehicle) of a number of points (e.g., a point cloud) that correspond to objects that have reflected a ranging laser of one or more mapping vehicles at the geographic location. As an example, sensor data may include LiDAR point cloud data that represents objects in the roadway, such as, other vehicles, pedestrians, cones, debris, etc.

A vehicle computing system can control the AV on a trajectory (e.g., a path) as it traverses a roadway or traverses between roadways (e.g., a lateral transition from a first roadway to a second roadway, a linear transition from a first roadway to a second roadway, a merger from a first roadway into a second roadway, and/or the like). The appropriate trajectory can be affected by objects that are encountered by the AV along the route, such as, other vehicles, pedestrians, signage, and the like. In some non-limiting embodiments, a vehicle computing system may employ topological planning techniques to navigate these objects. In such topological planning techniques, the objects and the actions available in response to such objects may be represented as a hierarchical architecture for generating trajectories for the AV. In some non-limiting embodiments, this process of trajectory planning can include generating sets of candidate constraints that specify semantic longitudinal and lateral actions (e.g., stop at stop line, pass object on right); optimizing a trajectory for each candidate constraint set where the trajectory satisfies the constraints and is feasible with respect to the dynamic limits of the AV; and selecting the best candidate trajectory for execution. An example of topological planning in AV driving is set forth in U.S. application Ser. No. 16/597,283, the disclosure of which is expressly incorporated herein by reference.

Referring now to FIG. 1A, FIG. 1A provides an environment 100 in which devices, systems, and/or methods, herein, may be implemented. Environment 100 can include AV 102 and actor 104.

In some non-limiting embodiments or aspects, AV 102 evaluates risks and effects on comfort caused by future proximity or margins to other objects. The risk or discomfort rating is referred to as a score (e.g., a cost, etc.). Motion planning generates multiple candidate trajectories at a time using this score, among others, to select a trajectory to follow.

In some examples, generating candidate trajectories involves a motion planning task to generate constraint sets that are composed of possible actions (e.g., constraints, etc.), for each object. Each of these constraints may define a sequence of actions to be taken over particular time intervals. For instance, an action could involve AV 102 staying ahead of actor 104 from 4-6 seconds in the future. In such an example, a constraint associated with this action may involve AV 102 staying behind actor 104 from 0-2 seconds in the future, passing it from 2-4 seconds in the future, and staying ahead of it from 4-6 seconds in the future. A candidate trajectory is then generated for each constraint set. In such an example, constraints are used together in groups by an optimization routine to compute each trajectory.

In some examples, AV 102 may perform binary collision checking to determine a time at which a collision is expected. Binary collision checking can be implemented by generating convex hulls for AV 102 and predicted poses over a sampling of time intervals for actor 104. Geometric intersection checks may then be computed, finding intersections between AV 102 and actor 104 using the convex hulls at each time interval. Convex hulls are able to identify collisions between fast moving actors and ensure they are not omitted without requiring a very dense temporal sampling. Even when implemented correctly and efficiently, however, binary collision checking includes pitfalls. For example, it may be inefficient or unable to appropriately evaluate potential risks, without a dense sampling of predicted actor trajectories that would not be feasible for real time applications. Additionally, necessary consideration of comfort related to margins may not be captured.

In some non-limiting embodiments or aspects, computing scores for margins associated with other actors, may also rely on constraints. Such methods are effectively evaluating whether constraints are satisfied. However, such methods may fall short in a number of important ways. First, there is no guarantee that constraints can capture all of the generated trajectory's relevant interactions, as constraints are determined a priori, which may cause some risks to be underrepresented or unreported in the score. Second, heuristics that are used to modify interaction information are often applied to constraints to improve a generated result, but such results may include less information or include inconsistent data for scoring. Third, two candidate trajectories that are identical in terms of their spatiotemporal states may be treated differently based on constraints that were used to generate them. The result could be a suboptimal trajectory selection for AV 102 because of an incorrectly computed score for the margins to other actors.

With continued reference to FIG. 1A, to illustrate problems that must be overcome, environment 100 is shown in FIG. 1A. AV 102 is traversing the roadway, coming from behind actor 104 (e.g., a parked vehicle, a stationary object, etc.) and crossing pedestrian 106. In such an environment 100, three constraint sets may be found in this scenario. First candidate trajectory 108 is configured to stop AV 102 for actor 104. Second trajectory 112 is configured to stop AV 102 when crossing pedestrian 106 is predicted to be present in the AV lane moving across the lane on pedestrian trajectory 110, in a scenario where passing the pedestrian is too risky. Final trajectory 114 includes a constraint for moving ahead of the pedestrian, while the pedestrian is traversing the AV lane on pedestrian trajectory 110.

Based on final candidate trajectory 114, we see that because it has veered around actor 104, final candidate trajectory 114 interacts with pedestrian trajectory 110 in a different location than was used for configuring the constraint, which was based off of a reference path (RP) of the AV. A margin scoring implementation that relies on the constraints would, thus, misrepresent the true margins.

Provided are improved systems, methods, and computer program products for constraint independent scoring of margins for maneuvering an AV traversing a roadway. In some non-limiting embodiments or aspects, a system, such as, a vehicle computing system including a motion planner, may include at least one processor programmed or configured to receive information associated with one or more forecasts of one or more actors in a roadway, determine the relevance of each forecast with the trajectory of the AV, regenerate a distance table for the relevant trajectory, using an original distance table which was previously generated for processing constraints, generate a plurality of margins for the AV to evaluate, categorize the margins into a plurality of margin types for providing information about risks and effects on passenger comfort associated with future proximity of AV 102 to actor 104, and classify an interaction between AV 102 and actor 104 based on a plurality of margins, and generate continuous scores for each candidate trajectory that is also within the margin of the actor generated for the relevant trajectory.

In some non-limiting embodiments or aspects, controlling the AV involves motion planning to determine an optimal trajectory from a plurality of trajectories, and evaluate potential risks of each candidate trajectory, to optimize a candidate trajectory selected to control the AV by a margin scoring subsystem of the vehicle computing system.

According to the systems, methods, and computer program products described herein, provided are comprehensive and continuous evaluation of risk and comfort aspects of autonomous navigation, in addition to comprehensive and continuous evaluation of risk and comfort aspects of interactions with other actors in the roadway, may be provided, provided more sufficiently, and provided more efficiently.

Objective evaluation of candidate trajectories based on associated geometry in relation to the predictions of other actors, reduces and eliminates computational inefficiencies and inconsistent results, and further provides runtime efficiency through careful reuse of intermediate results, consistent frameworks for evaluating multiple classes of margins, handles right of way ("ROW") and uncertainty considerations, and provides margin data that is useful for the calculation of other scores.

Figure 1B:
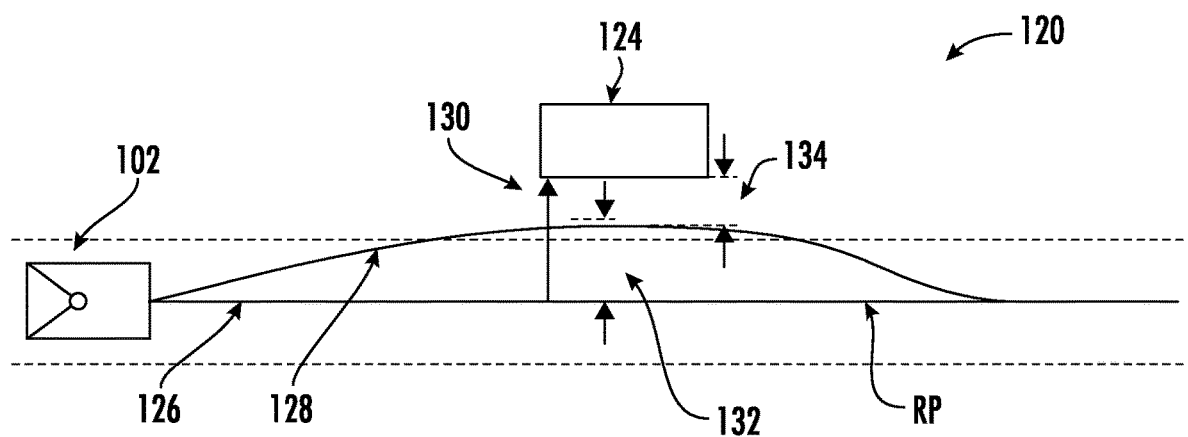

Referring now to FIG. 1B, FIG. 1B provides environment 120 in which devices, systems, and/or methods, herein, may be implemented. Environment 120 includes AV 102 and actor 124. AV 102, in some non-limiting embodiments or aspects, may be programmed or configured to determine a forecast relevance. It is desirable to determine whether a given forecast is potentially-relevant to AV 102, and may reduce or eliminate unnecessary computations while more efficiently operating for runtime. In some non-limiting embodiments or aspects, forecast relevance is performed by reusing some of the properties computed during constraint generation.

With continuing reference to FIG. 1B, as shown, AV 102 is planning to drive past actor 124. During constraint generation, reference path 126 may be used to determine minimum distance 130 to actor 124. For example, AV 102, in scoring candidate trajectory 128, determines maximum deviation 132 between reference path 126 and candidate trajectory 128. Since a maximum lateral margin that is deemed relevant to scoring may be predetermined (e.g., previously known, etc.), one or more processors can be programmed or configured to determine whether distance 134 between actor 124 and candidate trajectory 128 is relevant, before conducting any expensive geometric spatial checks. If the margins are not relevant, then expensive and unnecessary computations based on a predicted forecast about actor 124 are not needed and can be eliminated.

Figure 2:
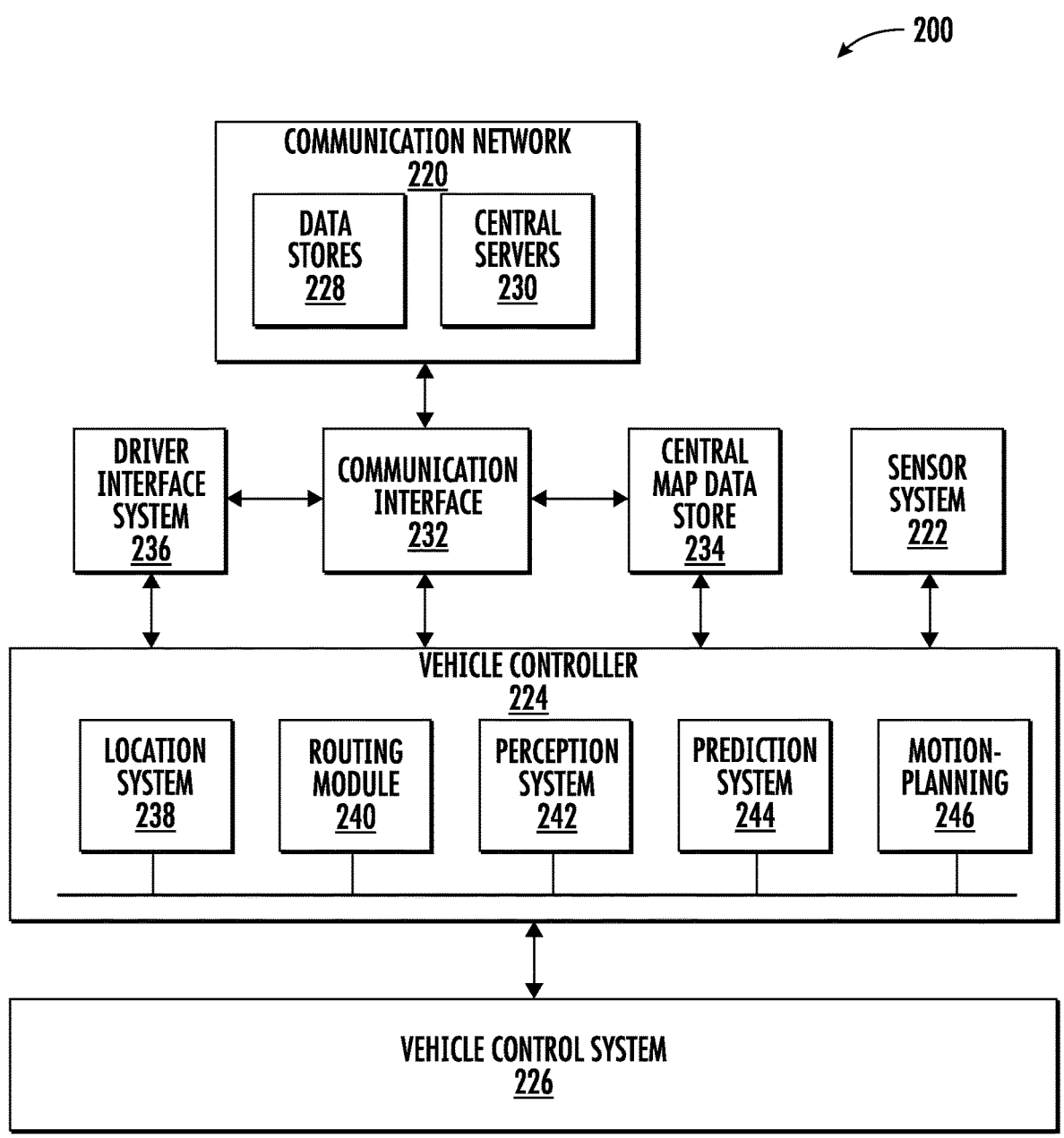
FIG. 2 is a diagram of non-limiting embodiments or aspects of an autonomous vehicle (AV) in which constraint independent scoring of margins and vehicle control, as described herein, may be implemented.

Referring now to FIG. 2, FIG. 2 is a diagram of an example vehicle computing system 200 in which devices, systems, and/or methods, described herein, may be implemented. As shown in FIG. 2, vehicle computing system 200 includes communication network 220, sensor system 222, vehicle controller 224, and vehicle control system 226. Vehicle computing system 200 may interconnect (e.g., establish a connection to communicate and/or the like) via communication network 220 to remote data and processing systems (e.g., sources, computing devices, external computing systems, etc.) of data store(s) 228 and central server(s) 230, for example, communication interface 232 of vehicle computing system 200 may utilize wired connections and/or wireless connections to provide an input or output exchange with local vehicle systems (e.g., one or more systems of AV 102, etc.).

With continued reference to FIG. 2, AV 102 may, additionally or alternatively, include sensor system 222, vehicle controller 224, vehicle control system 226, central map data store 234, and driver interface system 236. AV 102 may further include certain components (not shown here) included in vehicles, such as, an engine, wheels, steering wheel, transmission, etc., which may be controlled by vehicle control system 226 or, alternatively, vehicle controller 224, using a variety of communication signals and/or commands, such as, for example, acceleration signals or commands, deceleration signals or commands, steering signals or commands, braking signals or commands, etc.

In some non-limiting embodiments or aspects, vehicle computing system 200 includes components for autonomous operation of AV 102 to store or retrieve (e.g., request, receive, etc.) vehicle information from one or more data stores 228 and/or one or more central servers 230 via communication interface 232. For example, vehicle computing system 200 may synchronize (e.g., update, change, etc.) data of data store(s) 228 or interfaces of driver interface system 236, with map data (e.g., a portion of map data) in central map data store 234 or vehicle control information processed in central servers 230 as AV 102 is traversing a roadway. Multiple AVs may be coupled to each other and/or coupled to data stores 228 and/or central servers 230 by communication interface 232. Communication interface 232 may be any type of network, such as, a local area network (LAN), a wide area network (WAN), such as, the Internet, a cellular network, a satellite network, or a combination thereof, and may be wired or wireless. Remote data store(s) 228 may be any kind of data stores, such as, without limitation, map data stores, traffic information data stores, user information data stores, point of interest data store(s), or any other type of content data store(s). Central server(s) 230 may be any kind of servers or a cluster of servers, such as, without limitation, Web or cloud servers, application servers, backend servers, or a combination thereof.

Sensor system 222 may include one or more sensors that are coupled to vehicle controller 224 and/or otherwise connected or included within AV 102 of FIGS. 1A and 1B. Examples of such sensors include, without limitation, a light detection and ranging (LiDAR) system, a radio detection and ranging (RADAR) system, one or more cameras (e.g., visible spectrum cameras, infrared cameras, etc.), temperature sensors, position sensors, location sensors (e.g., global positioning system (GPS), etc.), fuel sensors, speed sensors, odometer sensors, motion sensors (e.g., inertial measurement units (IMU), accelerometer, gyroscope, etc.), object detection sensors, such as, one or more camera humidity sensors, environmental sensors (e.g., a precipitation sensor and/or ambient temperature sensor) occupancy sensors, or the like. The sensor data can include information that describes the location of objects within the surrounding environment of AV 102, information about the environment itself, information about the motion of AV 102, information about a route of AV 102, or the like.

With continued reference to FIG. 2, vehicle controller 224 may receive data collected by sensor system 222 and analyze it to provide one or more vehicle control instructions to vehicle control system 226. Vehicle controller 224 may include, without limitation, location system 238, perception system 242, prediction system 244, and motion planning system 246.

Location system 238 may include and/or may retrieve map data (e.g., map information, etc.) from central map data store 234 that provides detailed information about the surrounding environment of AV 102. In some non-limiting embodiments or aspects, location system 238 may include and/or may retrieve map data (e.g., map information, etc.) from central map data store(s) 234, central server(s) 230, central map data store 234, and/or a combination, that provides detailed information about the surrounding environment of AV 102. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists vehicle controller 224 in analyzing the surrounding environment of AV 102. In some non-limiting embodiments or aspects, the map data may also include reference path information that correspond to common patterns of vehicle travel along one or more lanes such that the motion of the object is constrained to the reference path (e.g., locations within traffic lanes on which an object commonly travels). Such reference paths may be pre-defined, such as, the centerline of the traffic lanes. Optionally, the reference path may be generated based on historical observations of vehicles or other objects over a period of time (e.g., reference paths for straight line travel, lane merge, a turn, or the like).

In some non-limiting embodiments or aspects, location system 238 may also include and/or may receive information relating to a trip or route of a user, real-time traffic information on the route, and/or the like.

Location system 238 may include and/or may be in communication with routing module 240 that generates a navigation route from a start position to a destination position for AV 102. Routing module 240 may access central map data store 234 to identify possible routes and road segments that a vehicle can travel on to get from the start position to the destination position. Routing module 240 may score the possible routes and identify a preferred route to reach the destination. For example, routing module 240 may generate a navigation route that minimizes Euclidean distance traveled or other cost function during the route and may further access the traffic information and/or estimates that can affect an amount of time it will take to travel on a particular route. Depending on implementation, routing module 240 may generate one or more routes using various routing methods, such as, Dijkstra's algorithm, Bellman-Ford's algorithm, or other algorithms. Routing module 240 may also use the traffic information to generate a navigation route that reflects expected conditions of the route (e.g., current day of the week or current time of day, etc.), such that a route generated for travel during rush-hour may differ from a route generated for travel late at night. Routing module 240 may also generate more than one navigation route to a destination and send more than one of these navigation routes to a user for selection by the user from among various possible routes.

Based on the sensor data provided by sensor system 222 and information obtained by location system 238, perception system 242 may determine perception information of the surrounding environment of AV 102 during travel from the start position to the destination along the preferred route. The perception information may represent what an ordinary driver would perceive in the surrounding environment of a vehicle. The perception data may include information relating to one or more objects in the environment of AV 102. For example, perception system 242 may process sensor data (e.g., LiDAR or RADAR data, camera images, etc.) in order to identify objects and/or features in the geospatial area of AV 102. The objects may include traffic signals, roadway boundaries, other vehicles, pedestrians, and/or obstacles, etc. Perception system 242 may use any now or hereafter known object recognition algorithms, video tracking algorithms, and computer vision algorithms (e.g., track objects frame-to-frame iteratively over a number of time periods) to determine the perception.

In some non-limiting embodiments or aspects, perception system 242 may also determine, for one or more identified objects in the environment, the current state of the object. The state information may include, without limitation, for each object: current location; current speed and/or acceleration; current heading; current orientation; size/footprint; type (e.g., vehicle vs. pedestrian vs. bicycle vs. static object or obstacle); and/or other state information.

Prediction system 244 may predict the future locations, trajectories, and/or actions of the objects based at least in part on perception information (e.g., the state data for each object) received from perception system 242, the location information received from location system 238, the sensor data, and/or any other data that describes the past and/or current state of the objects, AV 102, the surrounding environment, and/or their relationship(s). For example, if an object is a vehicle and the current driving environment includes an intersection, prediction system 244 may predict whether the object will likely move straight forward or make a turn. If the perception data indicates that the intersection has no traffic light, prediction system 244 may also predict whether the vehicle may fully stop prior to entering the intersection. Such predictions may be made for a given time horizon (e.g., 5 seconds in the future). In certain embodiments, prediction system 244 may provide the predicted trajectory or trajectories for each object to motion planning system 246.

Motion planning system 246 may determine a motion plan for AV 102 based on the perception data and/or the prediction data. Specifically, given predictions about the future locations of proximate objects and other perception data, motion planning system 246 can determine a motion plan for AV 102 that best navigates AV 102 relative to the objects at their future locations.

In some non-limiting embodiments or aspects, motion planning system 246 may receive the predictions from prediction system 244 and make a decision regarding how to handle objects in the environment of AV 102. For example, for a particular object (e.g., a vehicle with a given speed, a direction, a turning angle, etc.), motion planning system 246 decides whether to overtake, yield, stop, and/or pass based on, for example, traffic conditions, map data, state of AV 102, etc. In some non-limiting embodiments or aspects, for a given object, motion planning system 246 may decide a course to handle the object and may determine one or more safe actions for responding to the presence of the object. For example, for a given object, motion planning system 246 may decide to pass the object and then may determine whether to pass on the left side or right side of the object (including motion parameters, such as, speed and lane change decisions). Motion planning system 246 may also assess the risk of a collision between a detected object and AV 102. If the risk exceeds an acceptable threshold, AV 102 determines whether the collision can be avoided if the AV follows a defined vehicle trajectory, and, in such an example, can implement one or more dynamically generated emergency maneuvers in a pre-defined time period (e.g., N milliseconds) in reaction to the potential collision. If the collision can be avoided, then vehicle controller 224 may transmit appropriate control instructions to vehicle control system 226 for execution to perform a cautious maneuver (e.g., mildly slow down, accelerate, change lane, or swerve). In contrast, if the collision cannot be avoided, then vehicle controller 224 may transmit appropriate control instructions to vehicle control system 226 for the execution of an emergency maneuver (e.g., brake and/or change direction of travel).

Furthermore, motion planning system 246 also plans a trajectory ("trajectory generation") for AV 102 to travel on a given route (e.g., a nominal route generated by routing module 240). The trajectory specifies the geospatial path for AV 102, as well as, a velocity profile. The controller converts the trajectory into control instructions for vehicle control system 226 including, but not limited to, throttle/brake and steering wheel angle commands. Trajectory generation may involve making decisions relating to lane changes, such as, without limitation, whether a lane change is required, where to perform a lane change, and when to perform a lane change. Specifically, one objective of motion planning system 246 is to generate a trajectory for the motion of the vehicle from a start position to a destination on the nominal route, taking into account the perception and prediction data.

Motion planning system 246 may generate the trajectory by performing topological planning using the topological planning techniques described herein to generate a set of constraints for each of a plurality of topologically distinct classes of trajectories, optimizing a single candidate trajectory for each class, and scoring the candidate trajectories to select an optimal trajectory. Topological classes are distinguished by the discrete actions taken with respect to obstacles or restricted map areas. Specifically, all possible trajectories in a topologically distinct class perform the same action with respect to obstacles or restricted map areas. Obstacles may include, for example, static objects, such as, traffic cones and bollards, or other road users, such as, pedestrians, cyclists, and cars (e.g., moving cars, parked cars, double parked cars, etc.). Restricted map areas may include, for example, crosswalks and intersections. Discrete actions may include, for example, to stop before or proceed through, to track ahead or behind, or to pass on the left or right of an object (e.g., obstacle, constraint, etc.).

Motion planning system 246 may use the preferred route information provided by routing module 240 in combination with perception data and prediction data to select the optimal trajectory, as discussed below.

As discussed above, planning and control data regarding the movement of AV 102 is generated by motion planning system 246 of vehicle controller 224 that is transmitted to vehicle control system 226 for execution. Vehicle control system 226 may, for example, control braking via a brake controller; direction via a steering controller; speed and acceleration via a throttle controller (in a gas-powered vehicle), or a motor speed controller (such as, a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the controller to make decisions and use the decisions to control operations of one or more vehicle systems via the vehicle control system of the vehicle. However, the embodiments are not limited to this arrangement, as in various embodiments the analysis, decision making, and/or operational control may be handled in full or in part by other computing devices that are in electronic communication with the vehicle's on-board controller and/or vehicle control system. Examples of such other computing devices include an electronic device (such as, a smartphone) associated with a person who is riding in the vehicle, as well as, a remote server that is in electronic communication with the vehicle via a wireless network. The processor of any such device may perform the operations that will be discussed below.

With further reference to FIG. 2, communication interface 232 may be configured to allow communication between AV 102 and external systems, such as, for example, external devices, sensors, other vehicles, servers, data stores, databases etc. Communication interface 232 may utilize any now or hereafter known protocols, protection schemes, encodings, formats, packaging, etc., such as, without limitation, Wi-Fi, an infrared link, Bluetooth, etc. Driver interface system 236 may be part of peripheral devices implemented within AV 102 including, for example, a keypad, a touch screen display device (such as, a graphical user interface GUI)), a microphone, and a speaker, etc. For example, AV 102 may include a GUI on which is displayed a trajectory of AV 102, such as, by indicating an upcoming route of AV 102 as it navigates around one or more objects. The trajectory displayed on GUI may be one that is determined through the topological planning process described herein.

Figure 3:
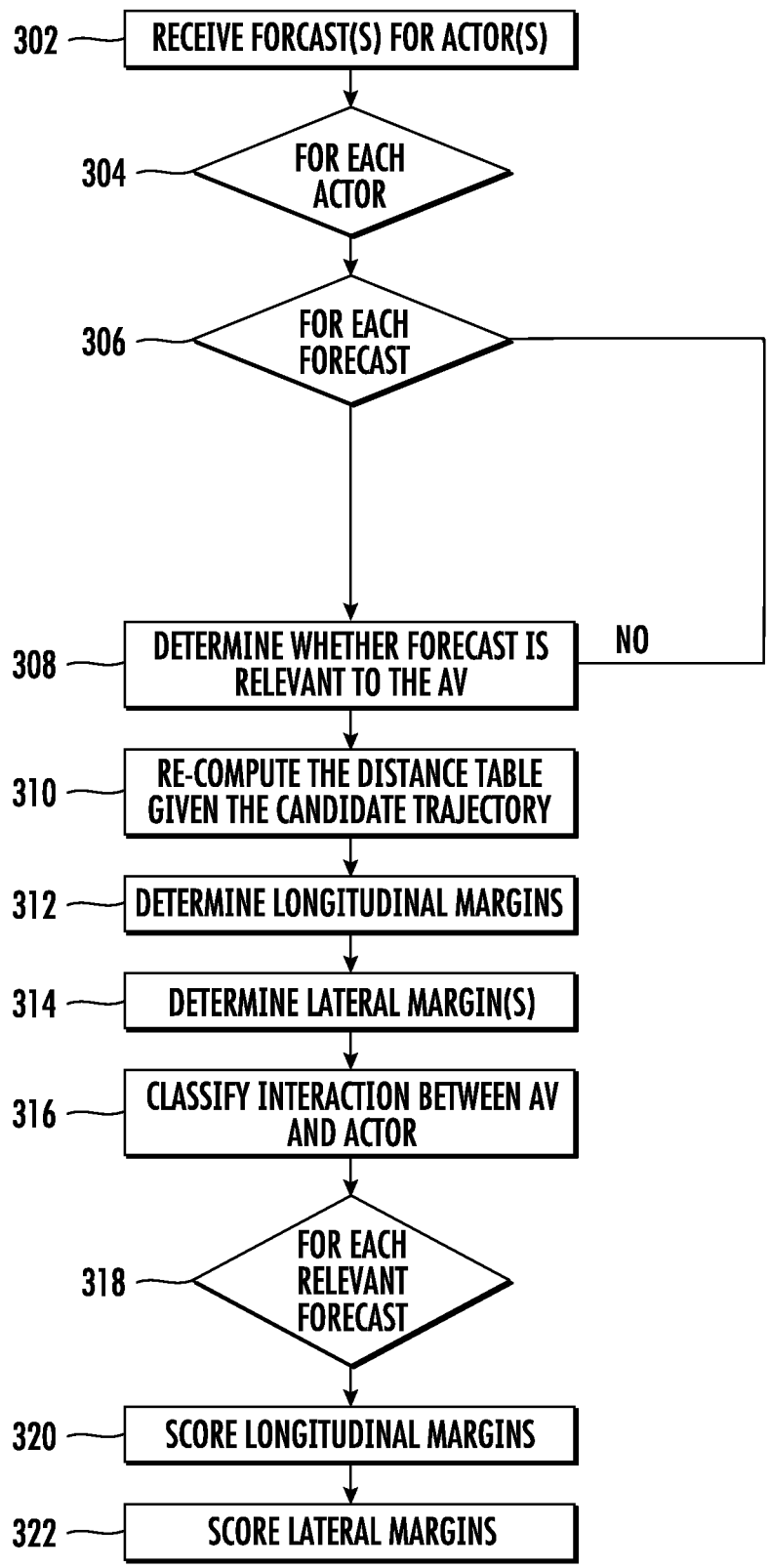
FIG. 3 is a flowchart illustrating a non-limiting embodiment or aspect of a method for generating continuous margin scores according to the principles of the present disclosure.

Referring now to FIG. 3, FIG. 3 is a step diagram of process 300 of vehicle computing system 200 for generating constraint independent and continuous margin scores that can be used by AV 102 to score candidate trajectories for maneuvering AV 102 while traversing a roadway. In some non-limiting embodiments or aspects, one or more steps of process 300 for generating and evaluating continuous scores for margins to actors in the roadway may be performed (e.g., completely, partially, and/or the like) by AV 102 (e.g., one or more devices of AV 102). In some non-limiting embodiments or aspects, one or more of the steps of process 300 may be performed (e.g., completely, partially, and/or the like) by vehicle computing system 200 (e.g., one or more devices of vehicle computing system 200, one or more processors of vehicle computing system 200), or by motion planning system 246 (e.g., one or more devices of motion planning system 246.

In some non-limiting embodiments or aspects, at first step 302, one or more forecasts for one or more actors are received, obtained, or generated. For example, vehicle computing system 200 receives forecast information associated with one or more predicted trajectories of one or more actors in a roadway. At step 304, vehicle computing system 200 iterates over each actor, to determine predictions about actor 104 in the roadway of AV 102. At step 306, vehicle computing system 200 iterates each forecast to determine forecasts of each actor separately.

In some non-limiting embodiments or aspects, at step 308, it is determined whether a forecast (e.g., a predicted trajectory of actor 104) is relevant to AV 102. For example, vehicle computing system 200, determines a relevant trajectory of an actor based on correlating a forecast for one or more predicted trajectories of the actor with the trajectory of the AV. Determining a relevant predicted trajectory of an actor according to some non-limiting embodiments or aspects is discussed in more detail hereinabove with respect to FIG. 1B.

In some non-limiting embodiments or aspects, at step 310 the distance table is regenerated for a given candidate trajectory. For example, vehicle computing system 200 regenerates a distance table for the relevant trajectory, using an original distance table which was previously generated for processing constraints. In such an example, regenerating the distance table regenerates (e.g., generates, etc.) a distance table for each actor given a candidate trajectory. In some examples, the distance table has been previously generated using a reference path. An example of topological planning in autonomous vehicle driving is set forth in U.S. application Ser. No. 17/172,530, filed on Feb. 10, 2021, the disclosure of which is expressly incorporated herein by reference. A distance table may include an interface to query lateral distances to, or alternatively, from actor 103, by interval location along a reference path at a time interval. In order to reason about a candidate trajectory or object in the proximity of AV 102, a distance table may be used to generate an expected margin to one or more actors. In some non-limiting embodiments or aspects, the distance table must be regenerated for each potentially-relevant actor against a candidate trajectory that is being scored. In some non-limiting embodiments or aspects, regenerating the distance table changes the distance table. For example, the distance table may be regenerated to change a previous distance table provided for processing constraint sets using a reference path of AV 102. In some examples, the reason for regenerating the distance table is to account for deviations between a candidate trajectory and a reference path used to generate or develop one or more candidate trajectories. The candidate trajectories may deviate significantly from the reference path, both laterally, as seen in FIG. 1A, and longitudinally, which affects the longitudinal margins to moving actors, such as, the pedestrian in FIG. 1B. Therefore, it may be necessary to regenerate a table to account for a candidate trajectory, instead of a reference path or some other generic driving path.

At step 312, longitudinal margins are determined. The longitudinal margin costs are computed as both distance and time margins. The temporal longitudinal margin for a given time interval considers how long AV 102 has until actor 104 reaches it. In some examples, this feature is relevant to actors traveling in areas where both cross-traffic and in-lane actions are necessary. Temporal longitudinal margins alone are insufficient to reason about actor margins and most evident in scenarios where actors are moving at low speeds and, thus, the temporal margins may be large despite AV 102 having a small spatial margin to actor 104.

In some non-limiting embodiments or aspects, vehicle computing system 200 generates a temporal longitudinal margin associated with a relevant time interval based on time remaining until AV 102 reaches actor 104. In some examples, vehicle computing system 200 generates a temporal longitudinal margin for a relevant time interval, by determining a position of the AV on a reference path and determining a proximate time interval (e.g., closest, within a threshold distance, etc.) where a location of a longitudinal interval of actor 104 overlaps with that of the position.

In some non-limiting embodiments or aspects, vehicle computing system 200 generates a spatial longitudinal margin that provides information for determining a proximity of an actor when moving at low speeds where the temporal longitudinal margins may be large despite AV 102 having a small spatial margin to the actor. In such an example, generating the spatial longitudinal margin includes, for each relevant time interval, determining a location interval (e.g., reference path location interval, longitudinal interval, etc.) of actor 104 in a candidate trajectory of AV 102, where actor 104 is deemed to be within a threshold proximity (e.g., within a threshold, sufficiently close, within a predetermined distance, etc.) of the candidate trajectory, such that, for example, actor 104 is considered to be in the path of AV 102. Vehicle computing system 200, then determines the longitudinal spatial margin based on a delta of a location interval of AV 102 and the actor's location interval. In some non-limiting embodiments or aspects, a delta comprises the differences between the two positions, such as, for example, a time interval. In other examples, in addition to time interval, the delta includes differences between object positions at different times, a difference in speed, variations in travel patterns, a separation distance, and/or the like. The longitudinal spatial margin is determined based on the delta.

At step 314, lateral margins are determined. For example, vehicle computing system 200 determines the lateral margin distance as the minimum lateral offset value over the longitudinal location interval of AV 102 for the time interval being evaluated. Determining lateral margins, according to some non-limiting embodiments or aspects, is discussed in more detail herein with respect to FIG. 6.

In some non-limiting embodiments or aspects, for more efficient results, vehicle computing system 200 generates temporal and spatial longitudinal margins for a sampling of various lateral margin thresholds. The margins for each threshold may have a configurable weight that may be applied in a final scoring stage. Determining longitudinal margins, according to some non-limiting embodiments or aspects, is discussed in more detail herein with respect to FIGS. 4 and 5.

At step 316, vehicle computing system 200 performs interaction classification between AV 102 and actor 104. Interaction classification is important for generating margin scores to remove uncertainty, to determine right of way, and to account for a predicted collision severity. Interaction classification determines these properties. The steps for interaction classification according to some non-limiting embodiments or aspects is discussed in more detail herein with respect to FIG. 8.

At step 318, for each relevant forecast (e.g., a predicted trajectory), the longitudinal margins are scored at step 320, and the lateral margins are scored at step 322. Vehicle computing system 200 determines scores for margins that can be used to makes sure that the AV does not collide with objects and also are used to maintain a safe speed and safe distance.

Particular technological improvements over other systems are included, such as, trajectory optimization where it would be necessary to compare discrete samples. For example, sampling of trajectories at a high rate, such as, every second, is known to be inefficient and computationally expensive when used exclusively. In addition, using only discretely selected samples may overlook, miss, or ignore worst case interactions, such as, where an AV or object is moving across an intersection at a very high rate of speed. In such an example, the AV may determine that is safe to cross ahead of the object, but unaccounted for conflicts may arise after starting, such as, for example, when the object may pass much closer than predicted to an actor, causing undesirable results.

In some non-limiting embodiments or aspects, the margins are scored. The scoring margins can be used to determine fault, such as, determining who had the right of way (e.g., an actor, AV, etc.). In some examples, scoring margins can be used to determine whether AV 102 was ahead of actor 104. In another example, vehicle computing system 200 may determine the AV-side of action (e.g., ahead of AV, behind AV, unknown, or undetermined) based on the scoring margins. The scoring margins eliminate unnecessary computations, such as, for example, when no distance interval for a car exists at an interval. In this way, vehicle computing system 200 can eliminate expensive computations determining positioning of cars with respect to each other.

In some non-limiting embodiments or aspects, vehicle computing system 200 determines cost of a candidate trajectory based on scoring margins. For example, vehicle computing system 200 may use scoring margins to determine right of way. In such an example, scoring margins can be programmed or configured for determining when or where AV 102 is ahead of actor 104. In this example, AV 102 may have more right of way and less risk (e.g., the actor following needs to make more decisions, etc.). Vehicle computing system 200 may also provide increases in penalty, such as, when AV 102 is behind actor 104 (e.g., options are mainly falling on AV 102, etc.).

In some non-limiting embodiments or aspects, vehicle computing system 200 may use scoring margins and geospatial information to detect a collision. For example, vehicle computing system 200 generates information from scoring margins to detect potential collisions, such as, when actor 104 moves according to forecast and AV 102 executes a trajectory. Vehicle computing system 200 may determine severity, fault, basic reasoning, and/or the like, about a trajectory of AV 102.

In some non-limiting embodiments or aspects, vehicle computing system 200 generates continuous scores (e.g., continually determines or generates margin scores). The margin scores may include a penalty configured by transforming a margin value at each time interval into a penalty. In some examples, margin scores may include a discount factor to account for increasing uncertainty about interactions that may be performed in the future. The discount factor at each subsequent time interval may include an offset from a start of a planning cycle for discounting attenuated uncertainty. In some non-limiting embodiments or aspects, margin scores may include an actor-type factor. For example, vehicle computing system 200 may generate discounting parameters per actor type, including at least one of a vehicle type, a crosswalk-following pedestrian type, other pedestrian type, cyclist type, other object type, and/or the like. The discount parameter may apply based on interaction classifications. In some examples, vehicle computing system 200 may generate a social acceptability factor that classifies a decision taken by a candidate trajectory with respect to the margins to a plurality of actors simultaneously. In the above examples, vehicle computing system 200 controls AV 102 based on continuous scores, such as, for example, to maneuver with respect to a plurality of constraints in the roadway.

Figure 7:
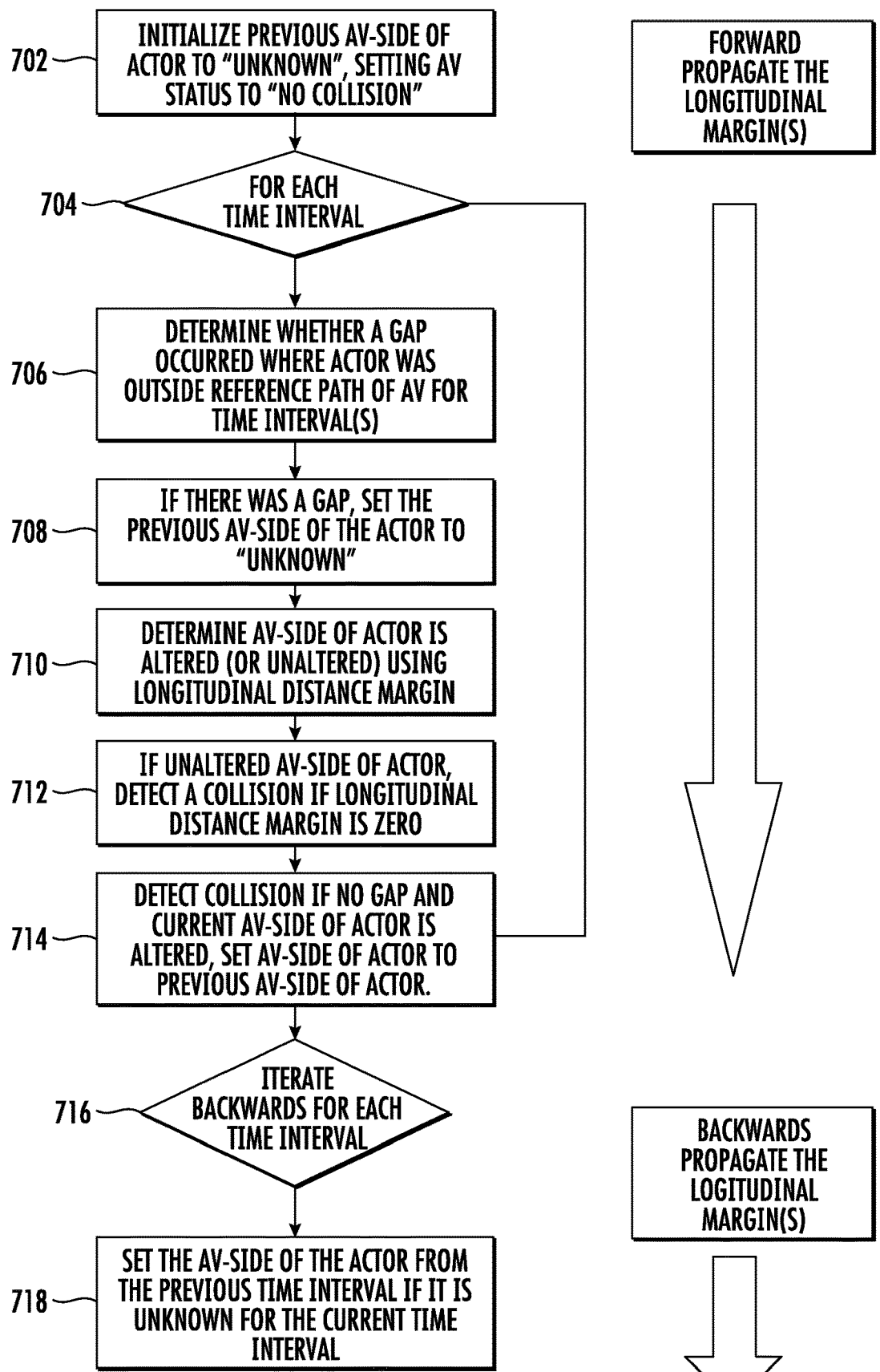
FIG. 7 is a flowchart illustrating a non-limiting embodiment or aspect of a method for determining an AV-side of an actor and accounting for post-collision margins according to the principles of the present disclosure.
Figure 8:
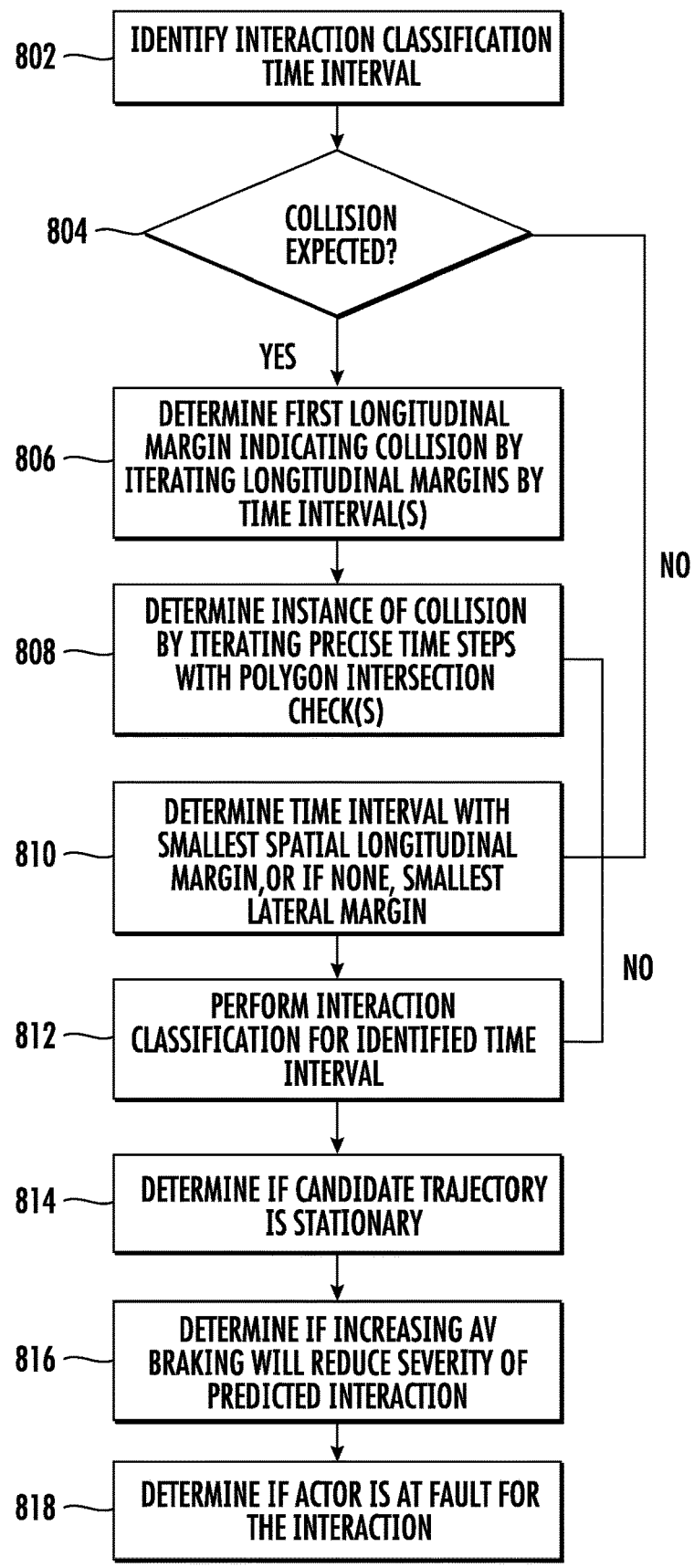
FIG. 8 is a flowchart illustrating a non-limiting embodiment or aspect of a method for classifying an interaction of an AV and an actor to determine properties of a forecast risk according to the principles of the present disclosure.

Margin scoring, according to some non-limiting embodiments or aspects, is further discussed in more detail herein with respect to FIGS. 7 and 8.

Figure 4:
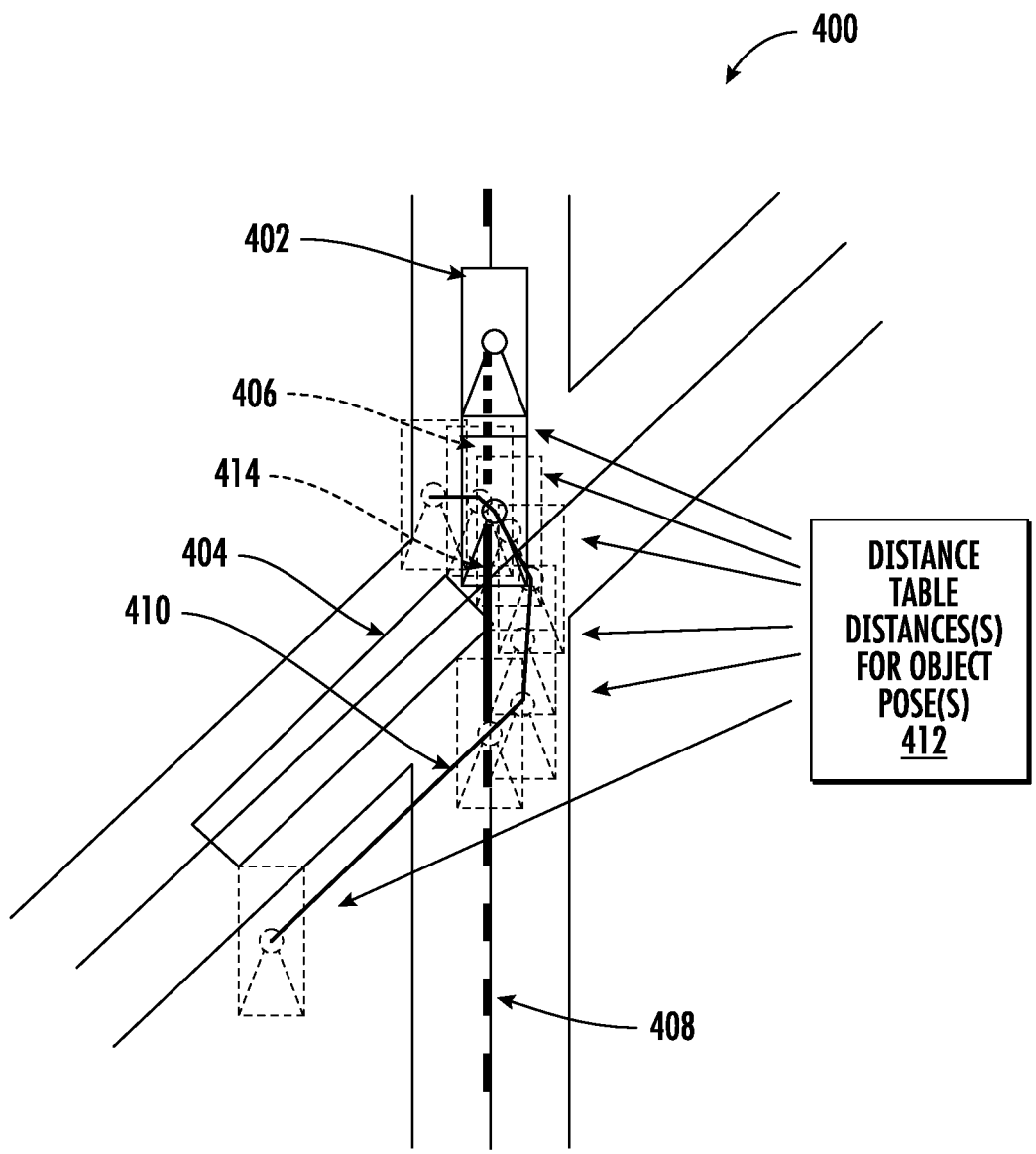
FIG. 4 is a diagram of non-limiting embodiments or aspects showing examples of temporal longitudinal margins employed for scoring trajectories of an AV according to the principles of the present disclosure.

Referring now to FIG. 4, FIG. 4 shows an exemplary temporal longitudinal margin generated for scoring a trajectory, such that, a feature of the temporal longitudinal margin is utility and relevance for scoring candidate trajectories for both cross-traffic objects and in-lane objects.

In some non-limiting embodiments or aspects, vehicle computing system 200 generates a temporal longitudinal margin for predicting how long AV 402 has before actor 404 reaches its location. For example, while AV 402 is traversing candidate trajectory 408 during time interval [t1, t2], vehicle computing system 200 determines how long before a reference path 126 of actor 404 (e.g., an object or vehicle in the roadway) intersects any of candidate trajectory 408 of AV 402.

In some non-limiting embodiments or aspects, in order to determine a point of intersection (e.g., overlap), vehicle computing system 200 generates a distance margin 412 based on a predicted distance of actor 404 from the longitudinal interval 406 (e.g., location interval 414) of AV 402 at each time interval until an overlap is determined. For example, vehicle computing system 200 may check different distance margins for an interceding time interval (e.g., [t3, t4]) and determine no overlap is present during the timer interval. In such an example, vehicle computing system 200 continues to generate distance margins, until it generates distance margin 412 at time interval [t5, t6]) based on predicted actor poses 410 for actor 404 (e.g., object, etc.). In some non-limiting embodiments or aspects, vehicle computing system 200 determines at the time interval [t5, t6] that the location interval on the reference path of actor 404 overlaps (e.g., intersects) the location interval 414 on candidate trajectory 408 of AV 402. The temporal longitudinal margin is then generated by determining a delta between the two time intervals, for example, a delta between time interval [t5, t6] and time interval [t3, t4].

In some non-limiting embodiments or aspects, predicted actor poses 410 are obtained or retrieved for generating distance margin 412. In such an example, vehicle computing system 200 retrieves or obtains lateral distances that represent a distance to (or from) actor 404 from candidate trajectory 408, the lateral distances stored and searchable in the distance table in correspondence with a time interval.

In some non-limiting embodiments or aspects, distance table provides an interface to retrieve lateral distances to the actor (e.g., actors, objects, road end, lane end, etc.), the lateral distances stored and retrievable based on the time interval. The distance table may be sorted by time, so that vehicle computing system 200 may retrieve distances for a time interval of AV 402. The retrieved distances identify or determine the population of predicted actor poses 410 for the time interval. In such an example, predicted actor poses 410 are generated for one actor. In some examples, predicted actor poses 410 may be generated for multiple actors for corresponding time intervals.

Figure 5:
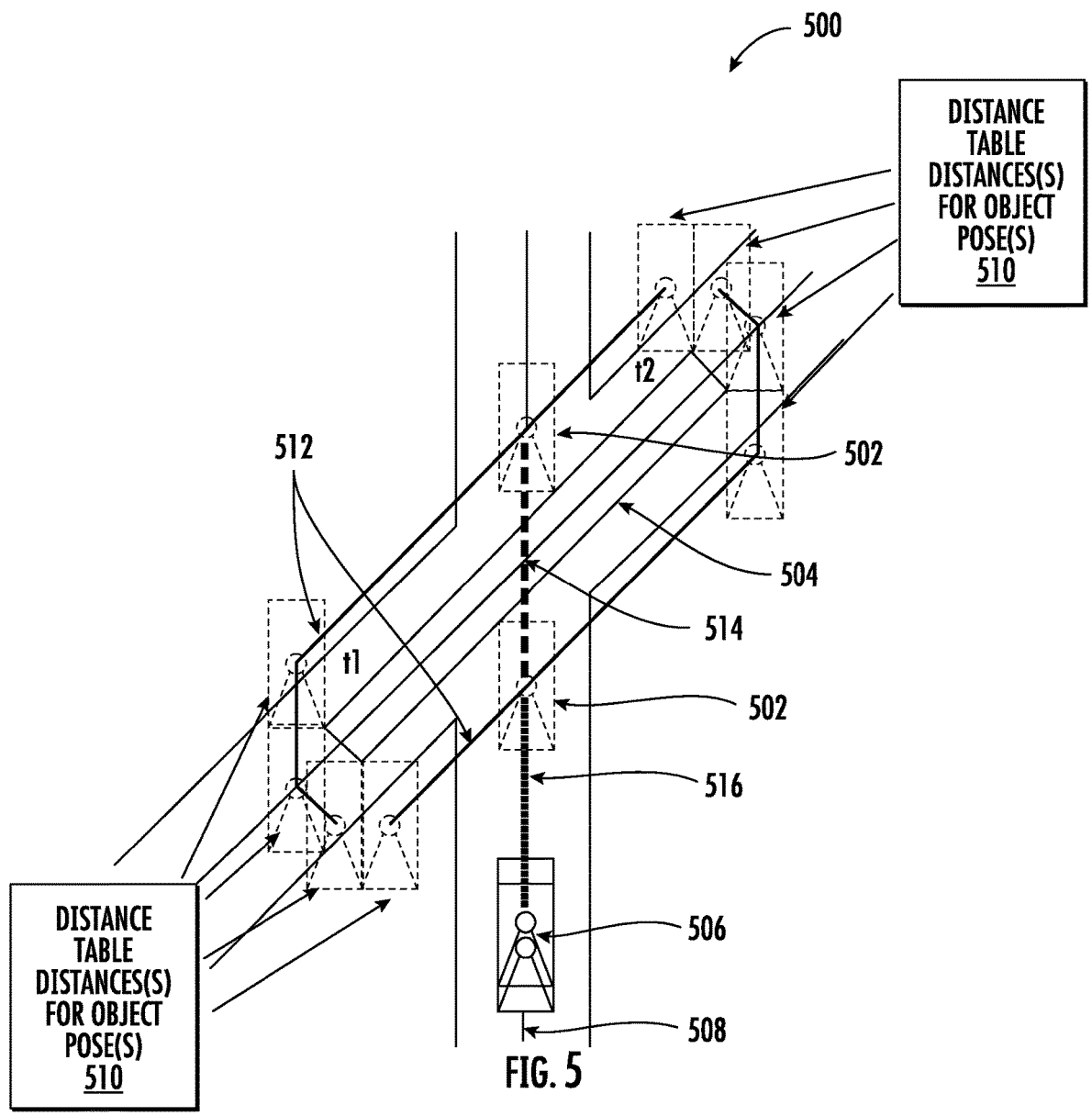
FIG. 5 is a diagram of non-limiting embodiments or aspects showing examples of spatial longitudinal margins employed for scoring trajectories of an AV according to the principles of the present disclosure.

In some non-limiting embodiments or aspects, longitudinal margins are defined with a particular lateral threshold. With reference to FIG. 4 and FIG. 5, the lateral threshold is set to 0 m. However, other thresholds can be used, such as, 1 m, 2 m, 3 m, etc. In some examples, for optimizing results, temporal longitudinal margins and spatial longitudinal margins are computed for a sampling of various lateral margin thresholds. In some non-limiting embodiments or aspects, margins for each threshold have a configurable weight that is applied in the final scoring stage. In some examples, these weights may be dependent on various factors that contribute to a measure of collision severity, including but not limited to the relative velocities, angles of impact, relative masses, and amounts of intersection between the AV and actor forecasts.

Referring now to FIG. 5, FIG. 5 shows an exemplary spatial longitudinal margin generated for scoring a trajectory. In some non-limiting embodiments or aspects, vehicle computing system 200 generates a spatial longitudinal margin 516 based on predicting an interaction between AV 502 and actor 504 in the roadway.

In some non-limiting embodiments or aspects, vehicle computing system 200 generates a distance margin 512 for determining an associated longitudinal interval (e.g., reference path location interval, etc.) of actor 504 during a time interval. For example, vehicle computing system 200 determines predicted actor poses 510 for actor 504 (e.g., object poses, etc.) during a time interval that may be used for generating distance margin 512 (e.g., a time interval as AV 502 traverses a roadway, etc.). In such an example, vehicle computing system 200 may retrieve or obtain lateral distances from distance table corresponding to longitudinal interval 514 (e.g., reference path location interval, etc.) of AV 502, or other lateral distance when checking each time interval individually. In such an example, vehicle computing system 200 generates and checks each time interval, and computes a longitudinal interval (e.g., reference path location interval, etc.) over which the actor is deemed sufficiently close to the candidate trajectory 508, to be considered in the path of AV 502. With reference to FIG. 5, vehicle computing system 200 computes longitudinal interval 514 (e.g., the reference path location interval as shown) over which the actor is deemed sufficiently close to the candidate trajectory 508, to be considered in the path of AV 502.

In some non-limiting embodiments or aspects, the distance table provides an interface to retrieve lateral distances to the actor (e.g., actors, objects, road end, lane end, etc.), the lateral distances are stored and retrievable based on the time interval, and returning a location that may intersect candidate trajectory 508 of AV 502 (e.g., the distance table is regenerated to transition the distances from a reference path based location to a candidate trajectory based location). The distance table may be sorted by time, so that vehicle computing system 200 may retrieve distances for a time interval of AV 502. The retrieved distances may identify or determine the population of predicted actor poses 510 within predicted distances around a candidate trajectory of AV 502. In such an example, predicted actor poses 510 must be generated for one actor. In some examples, distance poses may be generated for multiple actors in a corresponding time interval.

In some non-limiting embodiments or aspects, vehicle computing system 200 generates distance margin 512 based on predicted actor poses 510. For example, distance margin 512 demarcates a zone around actor 504, the zone being an area where interaction with AV 502 is predicted given the candidate trajectory of AV 502 during the given time interval, such as, the interval for [t1, t2] as shown in FIG. 5. In this example, vehicle computing system 200 determines, for time interval [t1, t2], a longitudinal interval 514 for actor 504 that is deemed sufficiently close (e.g., within a threshold, etc.) to the candidate trajectory to provide a lateral tolerance over the time interval.

In some non-limiting embodiments or aspects, vehicle computing system 200 determines the delta between longitudinal interval 506 of AV 502 at the time interval on candidate trajectory 508 and longitudinal interval 514 for actor 504. Longitudinal margin 516 is generated based on the delta and is determined to provide the minimum spatial offset value for longitudinal interval 506 at the current location of AV 502.

In some non-limiting embodiments or aspects, temporal margins of FIG. 4 are insufficient by themselves to provide reasoning about actor margins. For example, in scenarios where actors are moving at low speeds, temporal margins may be large despite AV 502 having a small spatial margin to the actor, creating a safety risk when a spatial longitudinal value is unavailable or incorrectly determined.

Figure 6:
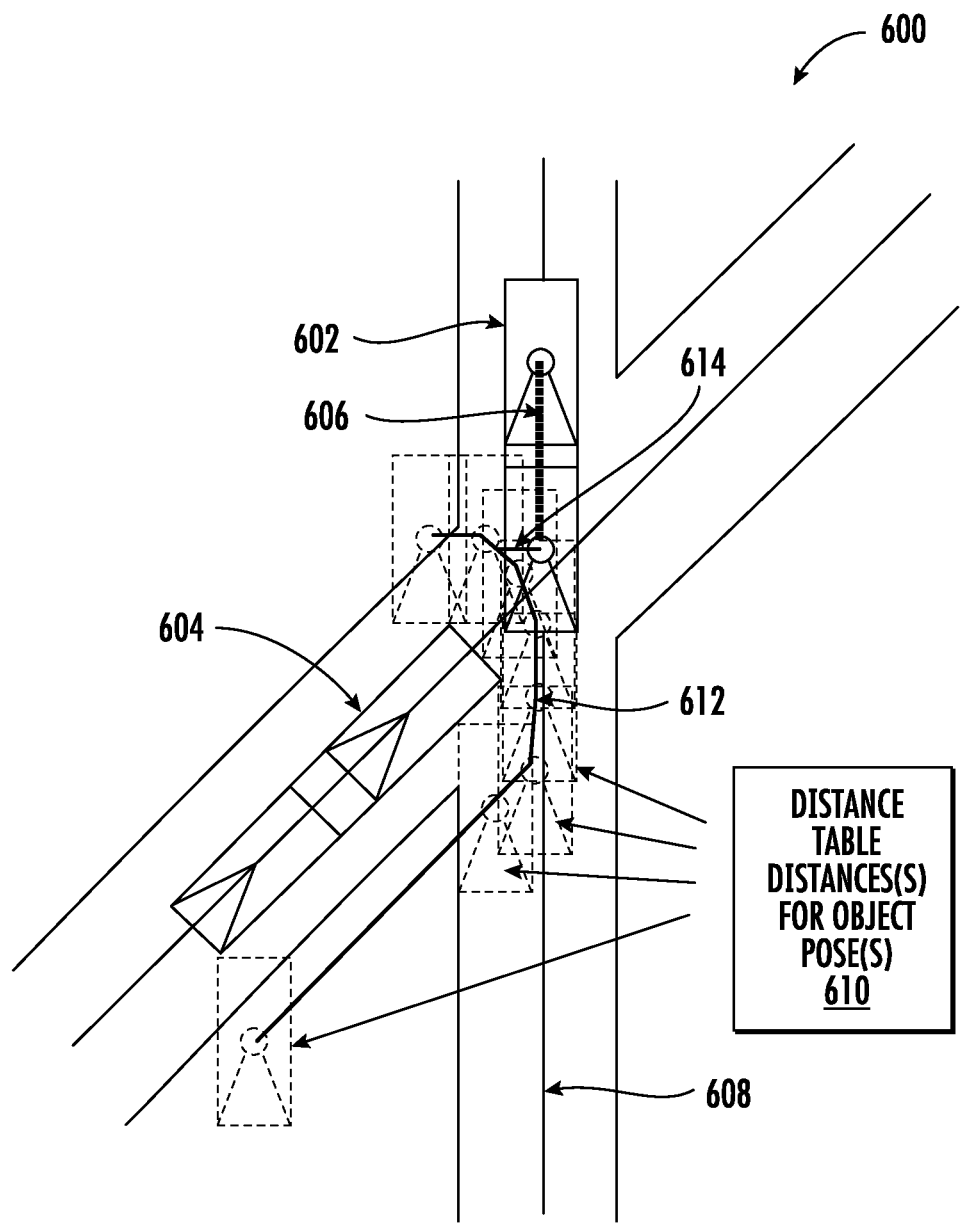
FIG. 6 is a diagram of non-limiting embodiments or aspects showing examples of lateral margins employed for scoring trajectories of an AV according to the principles of the present disclosure.

Referring now to FIG. 6, FIG. 6 shows an exemplary lateral margin generated for scoring a trajectory. In some non-limiting embodiments or aspects, vehicle computing system 200 generates a lateral margin 614 based on predicting an interaction between AV 602 and actor 604 in the roadway.

In some non-limiting embodiments or aspects, vehicle computing system 200 generates distance margin 612 based on a predicted position of the actor. For example, vehicle computing system 200 may determine predicted actor poses 610 for actor 604 (e.g., object, etc.) in the time interval that can be used for generating distance margin 612. In such an example, vehicle computing system 200 may retrieve or obtain lateral distances to the actor, stored in the distance table and corresponding to longitudinal interval 606 (e.g., reference path location interval, etc.) of AV 602.

In some non-limiting embodiments or aspects, the distance table provides an interface to retrieve lateral distances to the actor (e.g., actors, objects, road end, lane end, etc.), the lateral distances stored and retrievable based on the time interval and returning a location that may intersect candidate trajectory 608 of AV 602 (e.g., the distance table is regenerated to transition the distances from a reference path based location to a candidate trajectory based location). The distance table may be sorted by time, so that vehicle computing system 200 may retrieve distances for a time interval of AV 602. The retrieved distances may identify or determine the population of predicted actor poses 610 within predicted distances around a candidate trajectory of AV 602. In such an example, predicted actor poses 610 must be generated for one actor. In some examples, distance poses may be generated for multiple actors in a corresponding time interval.

In some non-limiting embodiments or aspects, vehicle computing system 200 generates distance margin 612 based on predicted actor poses 610. For example, distance margin 612 demarcates a zone around actor 604, the zone being an area where interaction with AV 602 is predicted given the candidate trajectory of AV 602 during the given time interval, such as, the interval for $[t_1, t_2]$ as shown in FIG. 6. In this example, vehicle computing system 200 determines, for time interval $[t_1, t_2]$, a lateral margin 614 to actor 604, which is determined to be the minimum lateral offset value over longitudinal interval 606 at the current location of AV 602.

Referring now to FIG. 7, FIG. 7 is a step diagram of process 700 that occurs at vehicle computing system 200 to determine and store an AV-side of an actor and account for post-collision margins for AV 102. In some non-limiting embodiments or aspects, one or more of the steps of process 700 for generating and evaluating continuous scores for margins to actors in the roadway may be performed (e.g., completely, partially, and/or the like) by AV 102 (e.g., one or more devices of AV 102). In some non-limiting embodiments or aspects, one or more of the steps of process 700 may be performed (e.g., completely, partially, and/or the like) by vehicle computing system 200 (e.g., one or more devices of vehicle computing system 200, one or more processors of vehicle computing system 200), or by motion planning system 246 (e.g., one or more devices of motion planning system 246.)

In some non-limiting embodiments or aspects, vehicle computing system 200 uses margin scoring for determining the AV-side of the actor and handling post-collision margins. In some examples, it is desirable to use different parameters for scoring longitudinal margins when the AV is staying behind actor 104, in contrast to moving ahead of actor 104. For this reason, an AV-side of the actor is determined at each time interval. Additionally or alternatively, in the event that AV 102 is expected to collide/intersect with a predicted trajectory of actor 104, additional care must be taken with the margins and AV-side of the actor. Once a pose of AV 102 and a predicted trajectory of actor 104 have collided, the semantics of the margins are invalid. A naive implementation which does not handle this explicitly, may assign a lower cost to a trajectory which moves through an object faster, defining larger margins on the other side for the remainder of the planning horizon.

The technical solution described herein overcomes technical problems by saturating margins and forward propagating the AV-side of the actor after the first point of intersection, within each contiguous sequence of time intervals where the action is occurring. Finally, if the AV side of the actor is ambiguous initially, which would happen if the AV and actor intersect at their first point of interaction, then the AV side of the actor is resolved through a backward propagation process.

Process 700 initializes at a first step 702, when vehicle computing system 200 initializes a previous AV-side of actor to "unknown" and AV status is set to "no collision". At step 704, vehicle computing system 200 performs an iteration over each time interval. For example, vehicle computing system 200 iterates over time intervals to propagate information to each interval along the trajectory. For example, vehicle computing system 200 generates an AV-side of the actor at each time interval based on a distance margin, in addition to one or more parameters for scoring longitudinal margins that can change based on the AV-side of the actor.

In some non-limiting embodiments or aspects, at step 706, vehicle computing system 200 determines whether a gap occurred, a gap includes situations where actor 104 was outside the reference path of AV 102 for one or more time intervals.

At step 708, if there was a gap, the previous AV-side of the actor is set to be unknown. At step 710, vehicle computing system 200 determines if the AV-side of actor is altered (or unaltered) using a longitudinal distance margin. Longitudinal margins are computed as both distance intervals and time intervals. Temporal longitudinal margins for given a time interval determine a time (e.g., how long, etc.) when actor 104 reaches AV 102. Spatial longitudinal margins determine a reference path distance interval over which actor 104 is deemed sufficiently close to the candidate trajectory to be considered in the path of AV 102.

At step 712, if an unaltered AV-side of actor 104 is determined at step 710, detect a collision when a longitudinal distance margin is determined to be zero. For example, vehicle computing system 200 detects a collision if the longitudinal distance is determined to be zero. At step 714, vehicle computing system 200 detects a collision has occurred if no gap is determined at step 706, and the current AV-side of actor is altered, and AV-side of the actor is set equal to previous AV-side of the actor.

In some non-limiting embodiments or aspects, at step 716, vehicle computing system 200 back propagates by iterating backwards for each time interval, and at step 718, setting the AV-side of the actor based on the previous time interval, if the AV-side of the actor is unknown for the current time interval.

Referring now to FIG. 8, FIG. 8 is a step diagram for the interaction classification process 800 that occurs at vehicle computing system 200 to determine, classify, or store an interaction between AV 102 and actor 104. In some non-limiting embodiments or aspects, one or more of the steps of process 800 for generating and evaluating continuous scores for margins to actors in the roadway may be performed (e.g., completely, partially, and/or the like) by AV 102 (e.g., one or more devices of AV 102). In some non-limiting embodiments or aspects, one or more of the steps of process 800 may be performed (e.g., completely, partially, and/or the like) by vehicle computing system 200 (e.g., one or more devices of vehicle computing system 200, one or more processors of vehicle computing system 200), or by motion planning system 246 (e.g., one or more devices of motion planning system 246.

In some non-limiting embodiments or aspects, at step 802, the process starts with steps to identity an interaction classification time interval. At step 804, if a collision is expected at step 806, vehicle computing system 200 determines a first longitudinal margin indicating a collision by iterating longitudinal margins for one or more time intervals until a collision is detected. At step 808, vehicle computing system 200 determines an instance of collision by iterating precise time steps with polygon intersection checks.

At step 810, vehicle computing system 200 determines a time interval with the smallest spatial longitudinal margin, or if no smallest spatial longitudinal margin, the smallest lateral margin. At step 812, to perform interaction classification for the identified time interval, at step 814, vehicle computing system 200 determines if a candidate trajectory is stationary. At step 816, vehicle computing system 200 determines if increasing AV braking will reduce severity of predicted interaction, at step 818, determine if actor is at fault for the interaction.

Although the above systems, methods, and computer program products have been described in detail for the purpose of illustration based on what is currently considered to be the most practical and preferred embodiments, it is to be understood that such detail is solely for that purpose and that the present disclosure is not limited to the described embodiments but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method of maneuvering an autonomous vehicle (AV) traversing a roadway, comprising:
receiving, by one or more processors of a vehicle computing system, forecast information associated with one or more predicted trajectories of an actor in the roadway;
regenerating, by the one or more processors, a distance table for a relevant trajectory of an action, using an original distance table which was previously generated for processing constraints, the relevant trajectory being based on a forecast for the one or more predicted trajectories of the actor with a trajectory of the AV;
generating, by the one or more processors, a plurality of margins for the AV to evaluate, the plurality of margins being based on a plurality of margin types for providing information about risks and effects on passenger comfort associated with a future proximity of the AV to the actor;
generating, by the one or more processors, continuous scores for each candidate trajectory from among a plurality of candidate trajectories, wherein each candidate trajectory is within a margin of the actor generated for the relevant trajectory; and
issuing, by the one or more processors, a command to control the AV based on the continuous scores, to maneuver with respect to a plurality of constraints in the roadway, wherein:
generating the continuous scores for each candidate trajectory is based on one or more of:
a penalty configured by transforming a margin value at a time interval into the penalty;
a discount factor to account for increasing uncertainty about interactions that will be performed further in future, wherein a subsequent time interval is offset from a start of a planning cycle;
an actor-type factor, discounting parameters per actor type, including at least one of a vehicle, a crosswalk-following pedestrian, other pedestrian, cyclist, or other object, to apply based on interaction classifications; or
a social acceptability factor that classifies a decision taken by a candidate trajectory with respect to the margins to a plurality of actors simultaneously.

2. The computer-implemented method of claim 1, wherein the plurality of margins include at least one of a longitudinal margin or a lateral margin and generating the plurality of margins further comprises:
 generating a temporal longitudinal margin associated with a relevant time interval based on time remaining until the AV reaches the actor, generating the temporal longitudinal margin, including for the relevant time interval: determining a position of the AV on a reference path and a nearest time interval where a location of a longitudinal interval of the actor overlaps with that of the position; and
 generating a spatial longitudinal margin providing information for determining proximity of the actor when moving at low speeds where the temporal longitudinal margins may be large despite the AV having a small spatial margin to the actor, generating the spatial longitudinal margin includes for the relevant time interval:
 determining lateral distance table entries of the actor and determining a location interval of the reference path over which the actor is deemed within a threshold of the candidate trajectory and considered in the reference path of the AV; and
 generating a lateral margin distance as a minimum lateral offset value over a longitudinal location interval of the AV for the relevant time interval being evaluated.

3. The computer-implemented method of claim 1, further comprising classifying an interaction between the AV and the actor as a collision, wherein the classifying the interaction comprises:
 performing an interaction classification to identify a time step associated with an instance of the collision, wherein the interaction classification identifies the time step in a time sequence of a collision time interval that a first polygon intersection is found,
  wherein the first polygon intersection identifies the collision time interval based on a first longitudinal margin of a plurality of longitudinal margins that indicates the collision; and
 otherwise, for a time interval, performing an interaction classification to identify a spatial longitudinal margin accounted to be a minimum spatial longitudinal margin in a location interval of a reference path when the actor is predicted to be at a minimum distance from the candidate trajectory of the AV, or alternatively, identifying the time interval over a longitudinal location interval of the actor when it is predicted to have a minimum lateral offset value from the candidate trajectory of the AV.

4. The computer-implemented method of claim 3, wherein performing the interaction classification comprises at least one of: providing scoring margins; configuring to remove uncertainty; incorporating right of way; or incorporating collision severity.

5. The computer-implemented method of claim 1, further comprising: iterating over multiple time intervals to propagate information to each time interval along the trajectory; and
 generating an AV-side of the actor at each time interval based on a distance margin, and one or more parameters for scoring longitudinal margins that can change based on the AV-side of the actor.

6. The computer-implemented method of claim 5, wherein a previous AV-side of the actor comprises at least one of: ahead-of-AV; behind-AV; unknown; or undetermined.

7. The computer-implemented method of claim 5, further comprising:
 identifying whether a spatial gap exists including at least one time interval since a previous time interval which, when traversed by the actor was not included in a reference path of the AV, and predicting, based on the time interval, whether the AV is predicted to move through the actor, or alternatively, beside or around the actor, based on when a distance interval switches from ahead of to behind the AV, or alternatively, behind the AV to ahead of the AV, the method comprising:
 setting a previous AV-side of the actor to be unknown if a spatial gap has been identified and there has not been a collision;
 setting the AV-side of the actor to be unaltered at the time interval based on a longitudinal distance margin and detecting the collision when the longitudinal distance margin is equal to zero;
 detecting the collision has occurred when a current AV-side of the actor has been altered and a gap in the distance interval is not found; and
 setting the current AV-side of the actor as the previous AV-side of the actor when the collision has occurred.

8. The computer-implemented method of claim 1, further comprising a backward propagation of a plurality of longitudinal margins from a first point of intersection between the actor and the AV, wherein backward propagation is determined by iterating backward over a time interval and setting an AV-side of the actor if it is unknown for a current time interval, using a previous time interval.

9. The computer-implemented method of claim 1, wherein a probability of a collision is based on one of: 1) a probability of a prediction adjusted to consider a right of way and reactivity, or 2) a predicted probability of compliance and an ability to adjust course; and
 wherein a severity of an anticipated collision is based on one of: 1) a relative speed of the AV and the actor, 2) an actor classification comprising one of: a vulnerable road user; a vehicle; an animal; a static actor; or a background actor, or 3) a point of impact on the AV, on the actor, or both.

10. A system for maneuvering an autonomous vehicle (AV) traversing a roadway, comprising:
 one or more processors; and
 a memory that stores one or more instructions that, when executed by the one or more processors, cause the one or more processors to:
 receive forecast information associated with one or more predicted trajectories of an actor in the roadway;
 regenerate a distance table for a relevant trajectory of an action, using an original distance table which was previously generated for processing constraints, the relevant trajectory being based on a forecast for the one or more predicted trajectories of the actor with a trajectory of the AV;
 generate a plurality of margins for the AV to evaluate, the plurality of margins being based on a plurality of margin types for providing information about risks and effects on passenger comfort associated with a future proximity of the AV to the actor;
 generate continuous scores for each candidate trajectory from among a plurality of candidate trajectories, wherein each candidate trajectory that is also within a margin of the actor generated for the relevant trajectory; and issue a command to control the AV based on the continuous scores, to maneuver with respect to a plurality of constraints in the roadway, wherein:

the continuous scores for each candidate trajectory, are based on one or more of:
- a penalty configured by transforming a margin value at a time interval into a penalty;
- a discount factor to account for increasing uncertainty about interactions that will be performed further in future, wherein a subsequent time interval is offset from a start of a planning cycle;
- an actor-type factor, discounting parameters per actor type, including at least one of a vehicle, a crosswalk-following pedestrian, other pedestrian, cyclist, or other object, to apply based on interaction classifications; or
- a social acceptability factor that classifies a decision taken by a candidate trajectory with respect to the margins to a plurality of actors simultaneously.

11. The system of claim 10, wherein the plurality of margins include at least one of a longitudinal margin or a lateral margin, and the one or more processors are further configured to:
generate a temporal longitudinal margin associated with a relevant time interval based on time remaining until the AV reaches the actor, generating the temporal longitudinal margin includes for the relevant time interval, determining a position of the AV on a reference path and the a nearest time interval where a location of a longitudinal interval of the actor overlaps with that of the position; and
generate a spatial longitudinal margin providing information for determining proximity of the actor when moving at low speeds, where the temporal longitudinal margins may be large despite the AV having a small spatial margin to the actor, and generating the spatial longitudinal margin, includes for the relevant time interval, further comprising:
generating lateral distance table entries associated with the actor; generating a location interval of the reference path over which the actor is deemed within a threshold of the candidate trajectory and considered in the reference path of the AV; and
generating a lateral margin distance as a minimum lateral offset value over a longitudinal location interval of the AV for the relevant time interval being evaluated.

12. The system of claim 11, wherein the one or more processors are further configured to classify an interaction between the AV and the actor to:
perform, in response to predicting a collision, an interaction classification to identify a time step associated with an instance of the collision, wherein the interaction classification identifies the time step in a time sequence of a collision time interval that a first polygon intersection is found,
wherein the first polygon intersection identifies the collision time interval based on a first longitudinal margin of a plurality of longitudinal margins that indicates a collision; and
otherwise, a time interval, perform an interaction classification to identify a spatial longitudinal margin accounted to be a minimum spatial longitudinal margin in a location interval of a reference path when the actor is predicted to be the least distance from the candidate trajectory of the AV, or alternatively, identify the time interval over a longitudinal location interval of the actor when it is predicted to have a minimum lateral offset value from the candidate trajectory of the AV.

13. The system of claim 12, wherein to perform the interaction classification, the one or more processors are further configured to provide scoring margins, configured to remove uncertainty, incorporate right of way, or incorporate collision severity.

14. The system of claim 10, wherein the one or more processors are further configured to:
identify whether a spatial gap exists including at least one time interval since a previous time interval which, when traversed by the actor, was not included in a reference path of the AV, and predicting, based on the time interval, whether the AV is predicted to move through the actor, or alternatively, beside or around the actor, based on when a distance interval switches from ahead of the AV to behind the AV or, alternatively, behind the AV to ahead of the AV, the one or more processors are further configured to at least one of:
set a previous AV-side of the actor to be unknown if a spatial gap has been identified and there has not been a collision;
set the AV-side of the actor to be unaltered at the time interval based on a longitudinal distance margin and detecting the collision when the longitudinal distance margin is equal to zero;
detect he collision has occurred when a current AV-side of the actor has been altered and a gap in the distance interval is not found; or
set the current AV-side of the actor as the previous AV-side of the actor when the collision has occurred.

15. The system of claim 14, wherein the one or more processors are further configured to backward propagate a plurality of longitudinal margins from a first point of intersection between the actor and the AV, wherein backward propagation is determined by iterating backward over a time interval and setting an AV-side of the actor if it is unknown for a current time interval, using a previous time interval.

16. The system of claim 10, wherein a probability of a collision is based on one of: 1) a probability of a prediction adjusted to consider a right of way and reactivity, or 2) a predicted probability of compliance and an ability to adjust course; and
wherein a severity of an anticipated collision is based on one of: 1) a relative speed of the AV and the actor, 2) an actor classification comprising one of: a vulnerable road user; a vehicle; an animal; a static actor; or a background actor, or 3) a point of impact on the AV, on the actor, or both.

17. A computer program product for maneuvering an autonomous vehicle (AV) traversing a route on a roadway, comprising at least one non-transitory computer-readable medium including one or more instructions that, when executed by one or more processors, cause the one or more processors to:
receive forecast information associated with one or more predicted trajectories of an actor in a roadway;
regenerate a distance table for a relevant trajectory of an action, using an original distance table which was previously generated for processing constraints, the relevant trajectory being based on a forecast for one or more predicted trajectories of the actor with a trajectory of the AV;
generate a plurality of margins for the AV to evaluate, the margins based on a plurality of margin types for providing information about risks and effects on passenger comfort associated with a future proximity of the AV to the actor;
generate continuous scores for each candidate trajectory from among a plurality of trajectories, wherein each candidate trajectory is within a margin of the actor generated for the relevant trajectory; and
issue a command to control the AV based on the continuous scores, to maneuver with respect to a plurality of constraints in the roadway, wherein:
the continuous scores for each candidate trajectory is generated based on one or more of:
  a penalty configured by transforming a margin value at a time interval into the penalty;
  a discount factor to account for increasing uncertainty about interactions that will be performed further in future, wherein a subsequent time interval is offset from a start of a planning cycle;
  an actor-type factor, discounting parameters per actor type, including at least one of a vehicle, a crosswalk-following pedestrian, other pedestrian, cyclist, or other object, to apply based on interaction classifications; or
  a social acceptability factor that classifies a decision taken by a candidate trajectory with respect to the margins to a plurality of actors simultaneously.

18. The computer program product of claim 17, wherein the plurality of margins include at least one of a longitudinal margin or a lateral margin, and further including one or more instructions that, when executed by the one or more processors, cause the one or more processors to:
generate a temporal longitudinal margin associated with a relevant time interval based on time remaining until the AV reaches the actor, generate the temporal longitudinal margin includes for the relevant time interval, and determine a position of the AV on a reference path and a nearest time interval where a location of a longitudinal interval of the actor overlaps with that of the position, further comprising;
generating a spatial longitudinal margin providing information for determining proximity of the actor when moving at low speeds where the temporal longitudinal margins may be large despite the AV having a small spatial margin to the actor, generating the spatial longitudinal margin includes for the relevant time interval;
generating lateral distance table entries of the actor and determine a location interval of the reference path over which the actor is deemed within a threshold of the candidate trajectory and considered in the reference path of the AV; and
generating a lateral margin distance as a minimum lateral offset value over a longitudinal location interval of the AV for the relevant time interval being evaluated.

* * * * *